United States Patent
Harold

(10) Patent No.: US 9,504,320 B2
(45) Date of Patent: Nov. 29, 2016

(54) FILE STORAGE CABINET

(71) Applicant: BINDER WAY PTY LTD, Dandenong South, Victoria (AU)

(72) Inventor: Brian Harold, Dandenong South (AU)

(73) Assignee: BINDER WAY PTY LTD, Dandenong South, Victoria (AU)

( * ) Notice: Subject to any disclaimer, the term of this patent is extended or adjusted under 35 U.S.C. 154(b) by 0 days.

(21) Appl. No.: 14/374,457

(22) PCT Filed: Jan. 25, 2013

(86) PCT No.: PCT/AU2013/000056
§ 371 (c)(1),
(2) Date: Jul. 24, 2014

(87) PCT Pub. No.: WO2013/110129
PCT Pub. Date: Aug. 1, 2013

(65) Prior Publication Data
US 2014/0333188 A1    Nov. 13, 2014

(30) Foreign Application Priority Data
Jan. 27, 2012  (AU) ................................ 2012900327

(51) Int. Cl.
*A47B 47/04* (2006.01)
*B42F 7/14* (2006.01)
*F16B 12/22* (2006.01)
(Continued)

(52) U.S. Cl.
CPC ............... *A47B 47/042* (2013.01); *B42F 7/14* (2013.01); *B42F 21/00* (2013.01); *F16B 12/22* (2013.01); *F16B 12/26* (2013.01)

(58) Field of Classification Search
CPC .... A47B 47/00; A47B 47/042; A47B 63/00; A47B 87/02; B42F 7/14; B42F 21/00; F16B 12/22; F16B 12/26

USPC ................. 312/107, 108, 111, 257.1; 211/42
See application file for complete search history.

(56) References Cited

U.S. PATENT DOCUMENTS 3,592,344 A * 7/1971 Schade ................. A47B 65/00
                                                 206/557
3,737,046 A    6/1973  Jeter
3,807,572 A    4/1974  Luvara et al.
(Continued)

OTHER PUBLICATIONS

International Search Report dated Mar. 25, 2013 for corresponding International Patent Application No. PCT/AU2013/000056, filed Jan. 25, 2013.

*Primary Examiner* — James O Hansen
(74) *Attorney, Agent, or Firm* — David D. Brush; Westman, Champlin & Koehler, P.A.

(57) ABSTRACT

A cabinet for the storage of files, books or papers comprising a floor panel, a vertically-arranged back panel fixed to the rear edge of said floor panel, vertically-arranged side panels fixed to the side edges of both said floor and back panels, a plurality of divider panels fixed to said floor and back panels and positioned parallel to and intermediate of said side panels, and a roof panel fixed to said side panels, said divider panels and said back panel; locating and releasable fixing means being provided along each panel edge abutting another panel; zones of said side and divider panels being provided with ribbing to stiffen them; the lower surfaces of said floor panel and upper surfaces of said roof panel being made with complementary shapings which cooperate to provide a locating function when multiple said cabinets are in stacked arrangement.

19 Claims, 19 Drawing Sheets

(51) Int. Cl.
*F16B 12/26* (2006.01)
*B42F 21/00* (2006.01)

(56) References Cited

U.S. PATENT DOCUMENTS

| | | | |
|---|---|---|---|
| 4,080,023 A | 3/1978 | Bair | |
| 4,178,047 A * | 12/1979 | Welch | F16B 12/22 |
| | | | 108/60 |
| 4,502,741 A * | 3/1985 | DeVries | A47B 47/042 |
| | | | 108/102 |
| 4,506,790 A | 3/1985 | Muscari | |
| 4,728,158 A | 3/1988 | D'Elia et al. | |
| 5,127,717 A | 7/1992 | Martinez | |
| 5,732,832 A * | 3/1998 | Kordowski | A47B 65/00 |
| | | | 211/184 |
| 5,797,665 A | 8/1998 | Jeter | |
| 6,056,377 A | 5/2000 | Jeter | |
| 6,193,340 B1 * | 2/2001 | Schenker | A47B 47/0075 |
| | | | 312/108 |
| 6,628,842 B1 | 9/2003 | Nagao | |
| 2006/0250052 A1 | 11/2006 | Davis et al. | |
| 2009/0255881 A1 * | 10/2009 | Su | B42F 7/145 |
| | | | 211/42 |

* cited by examiner

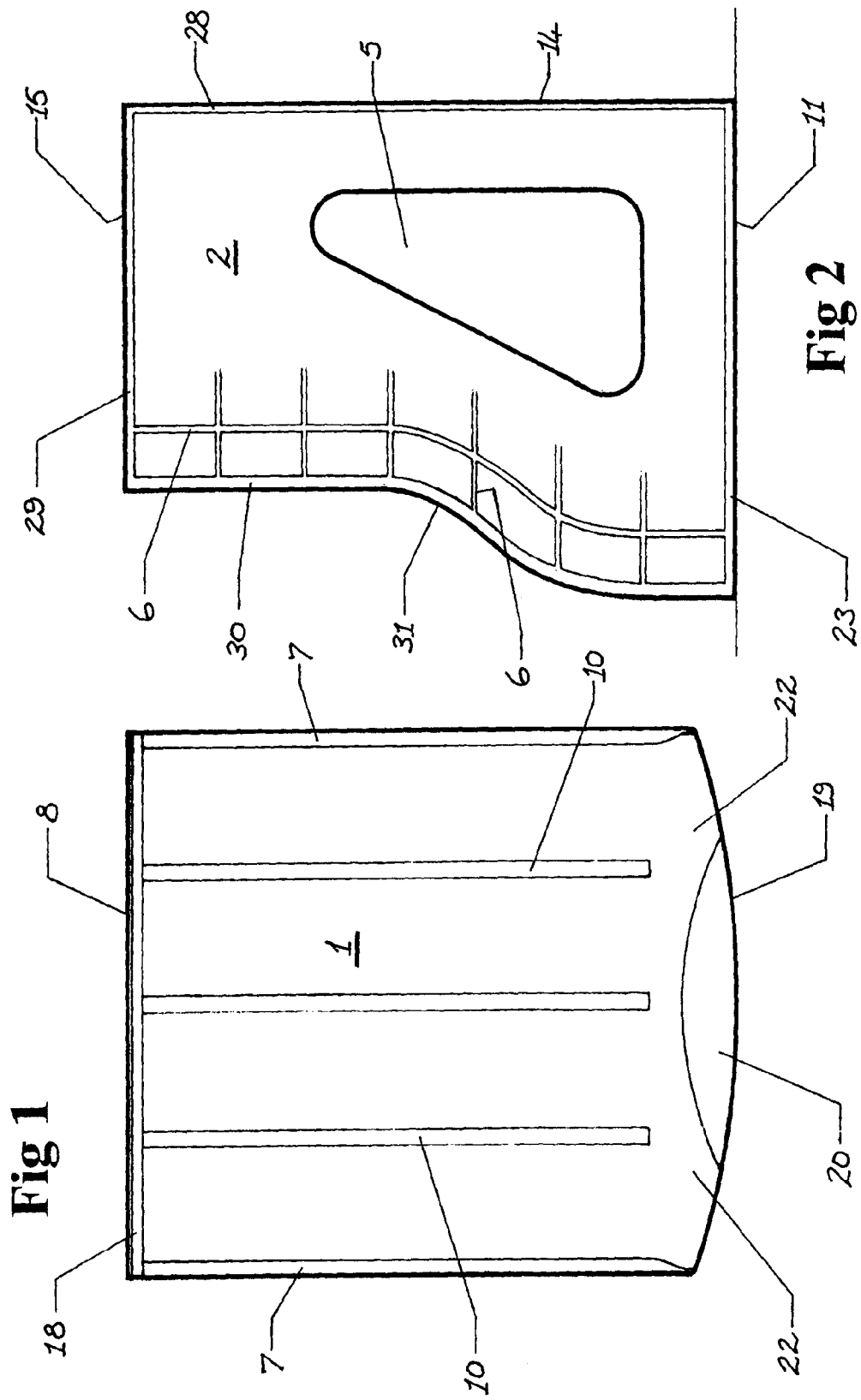

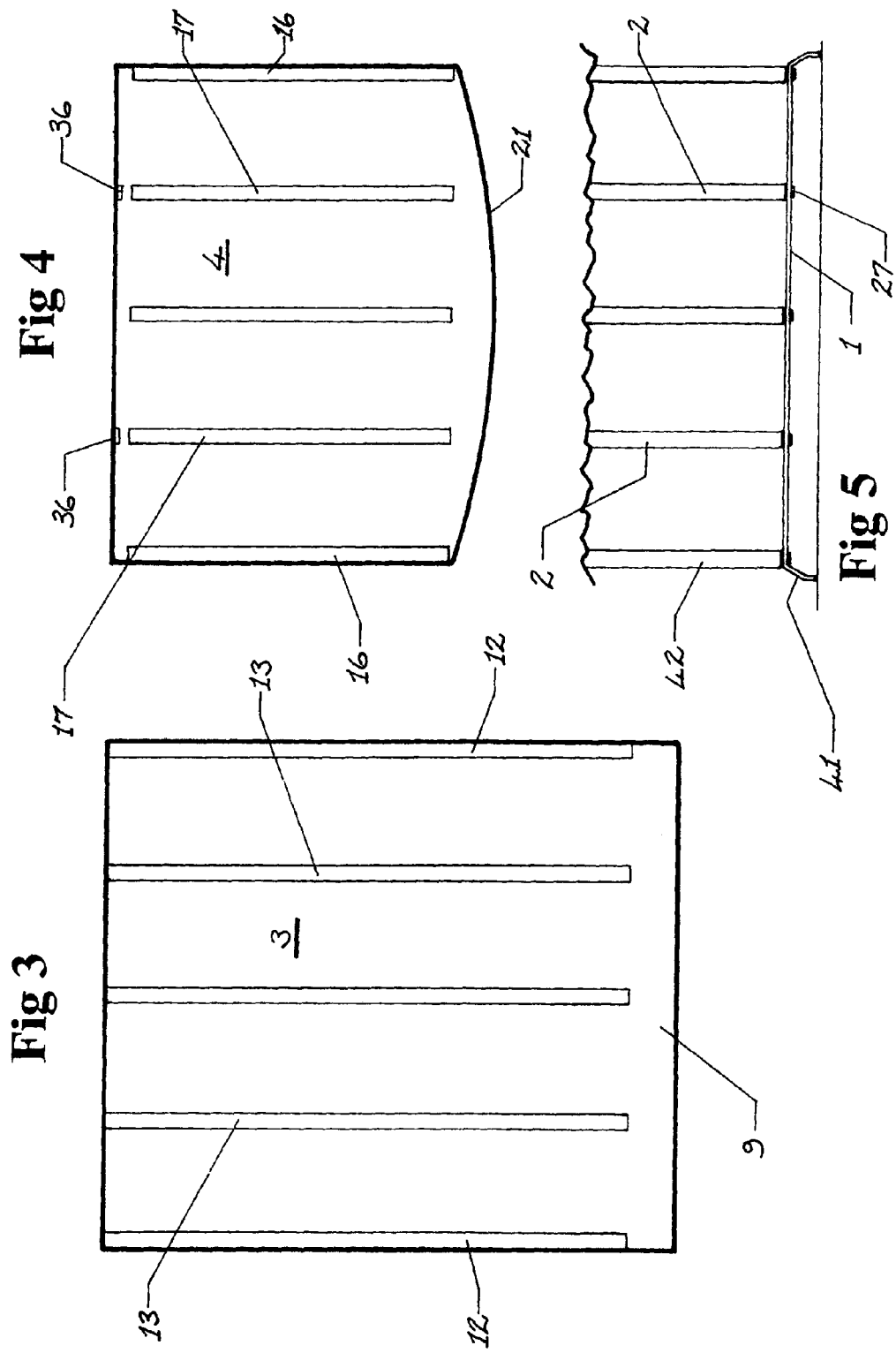

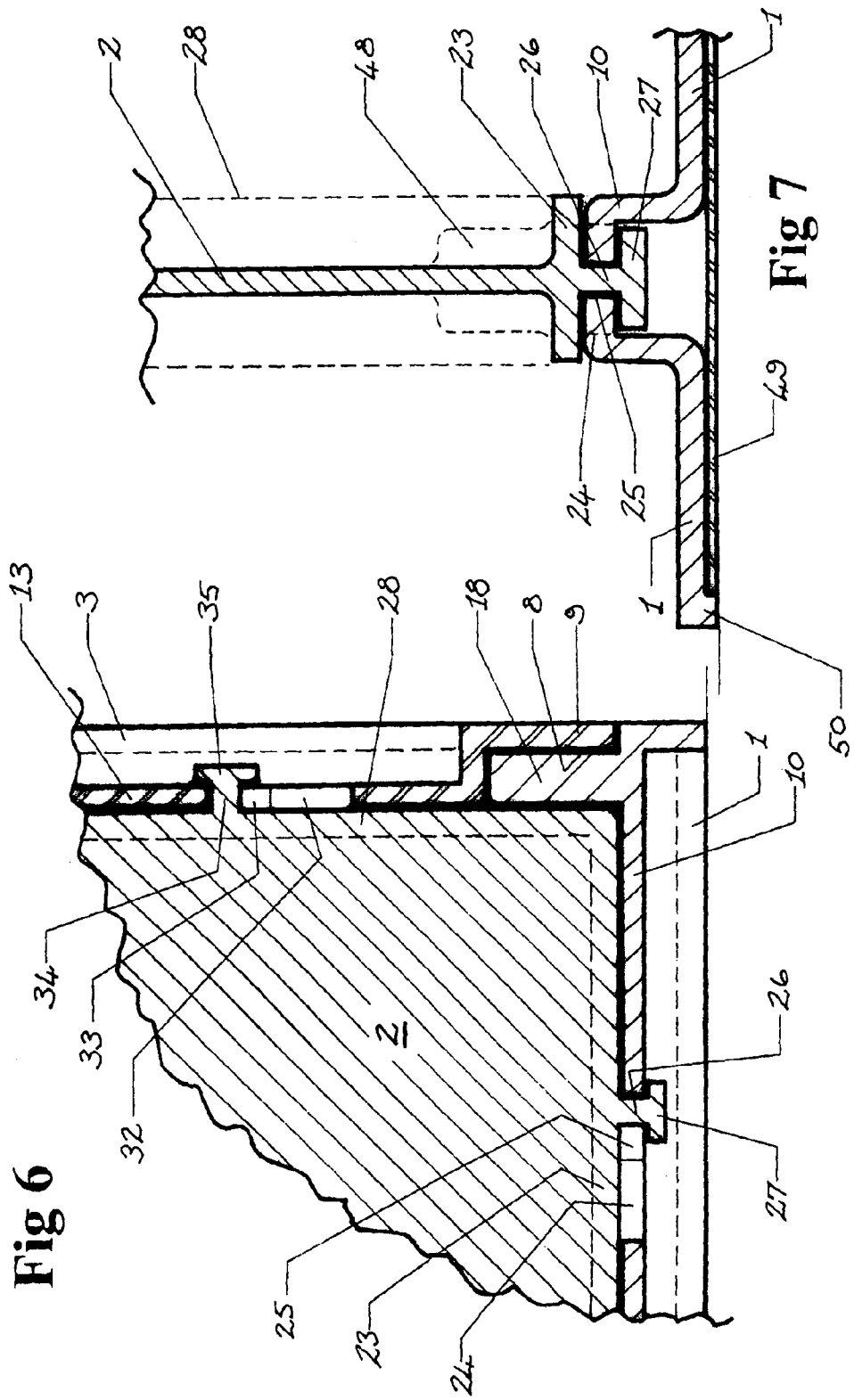

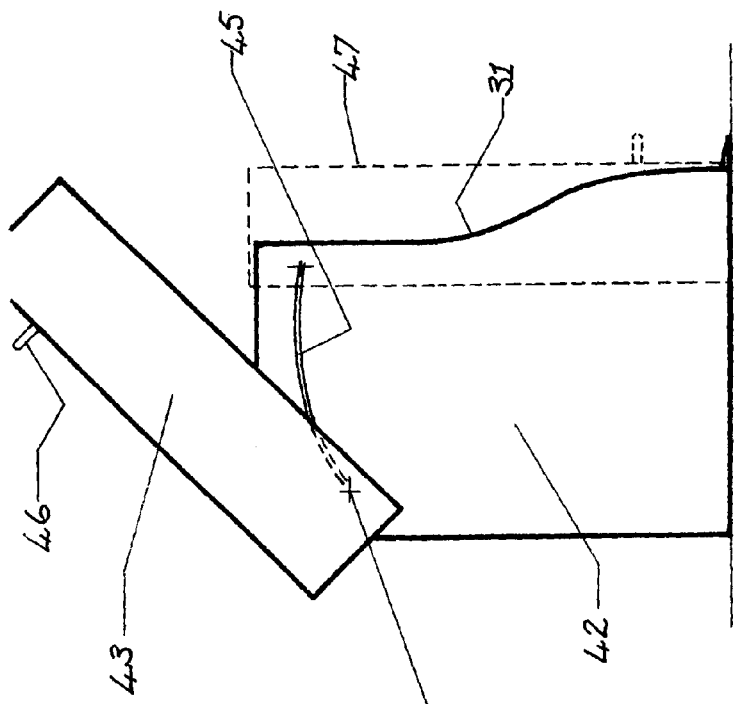
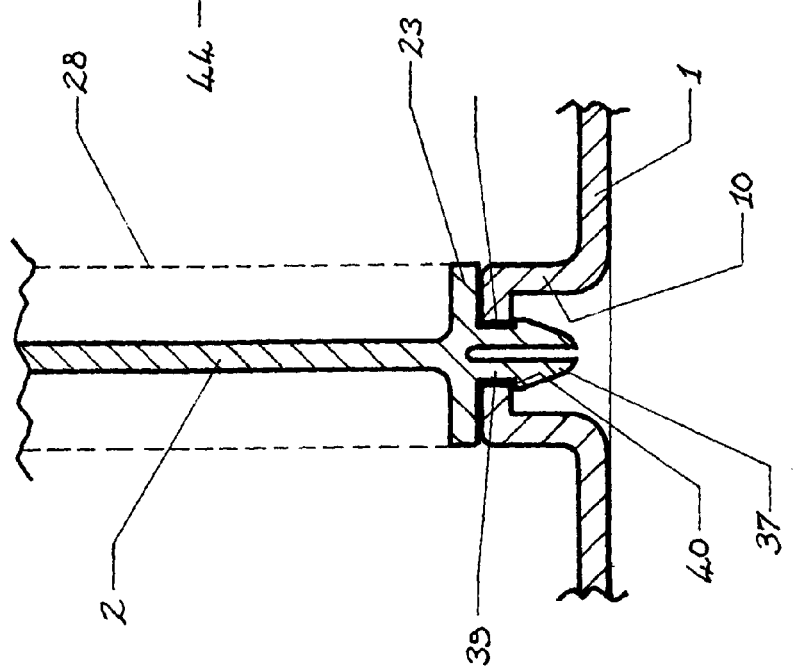

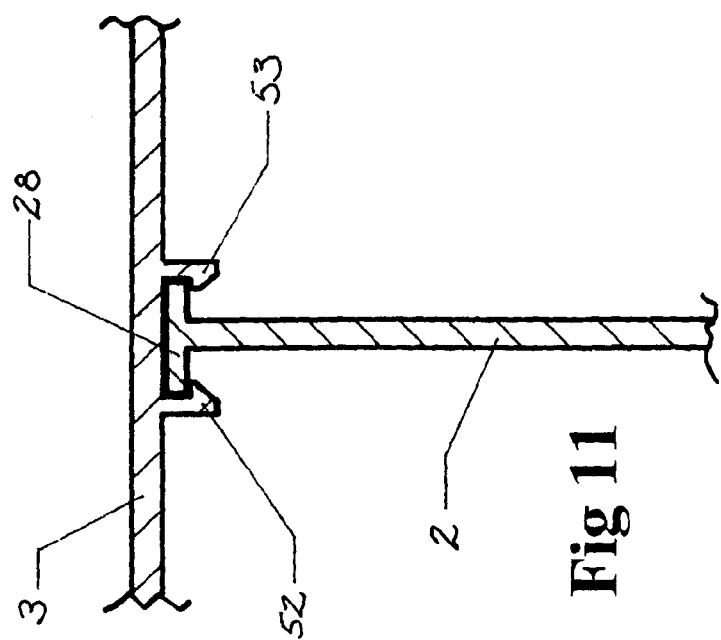
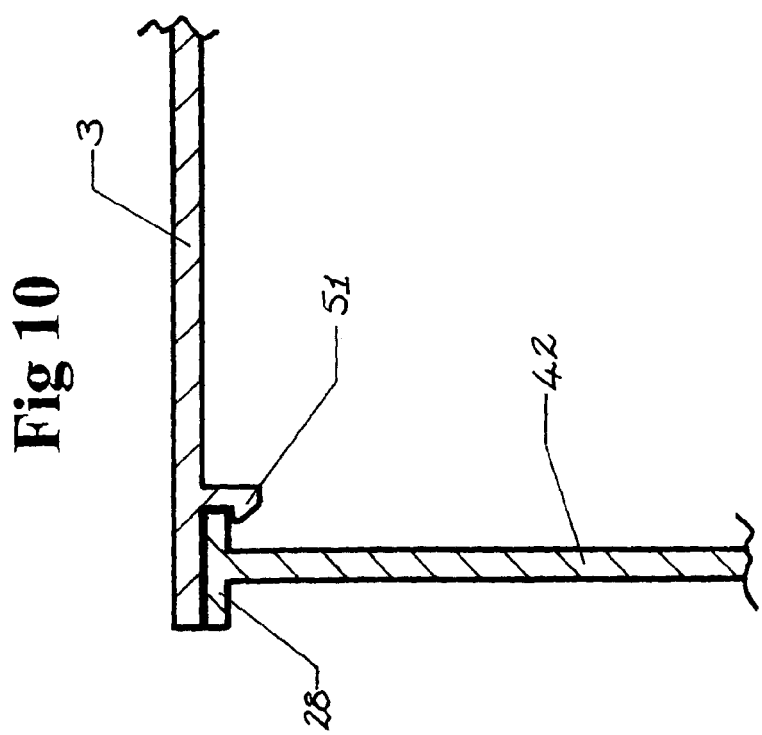

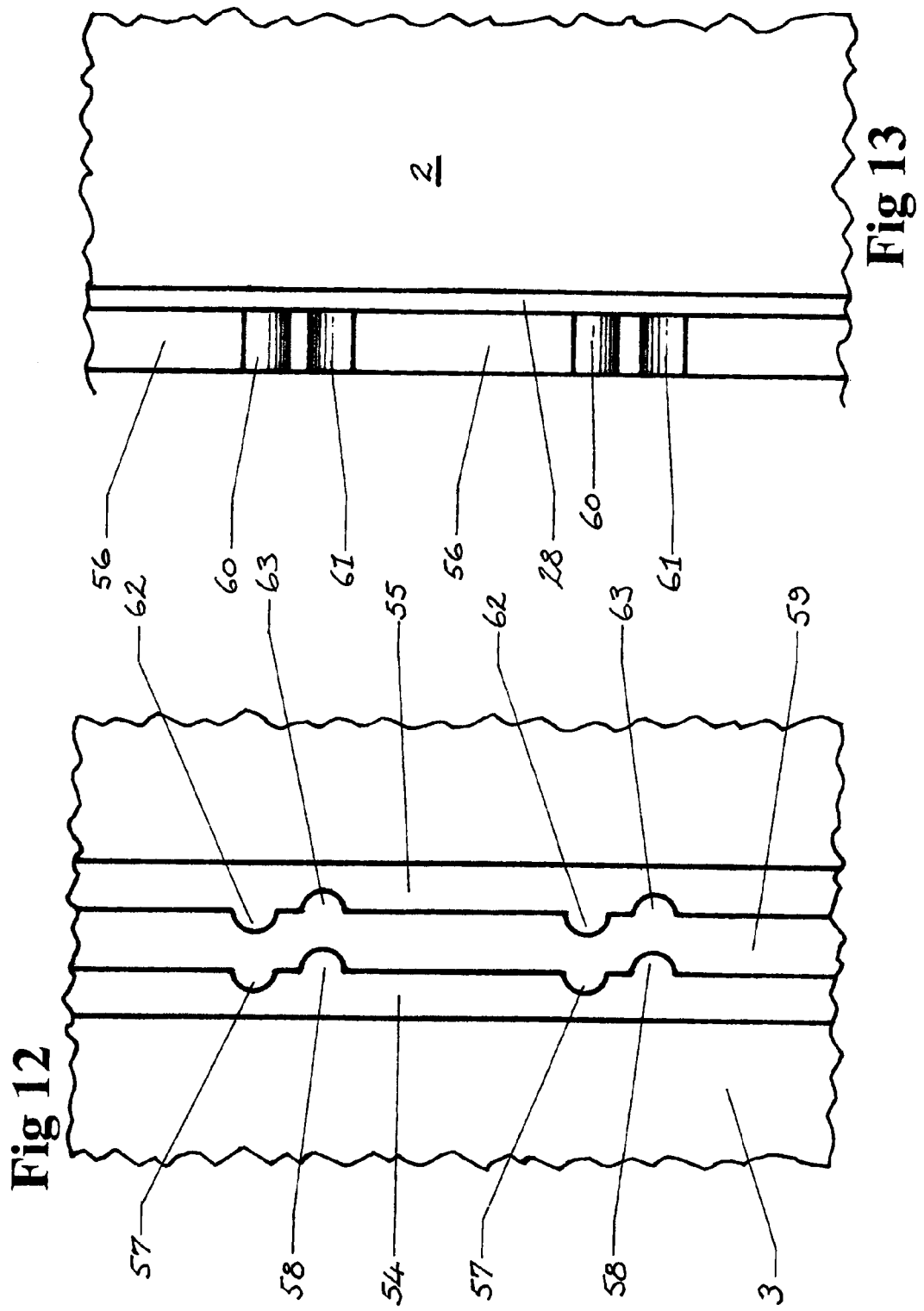

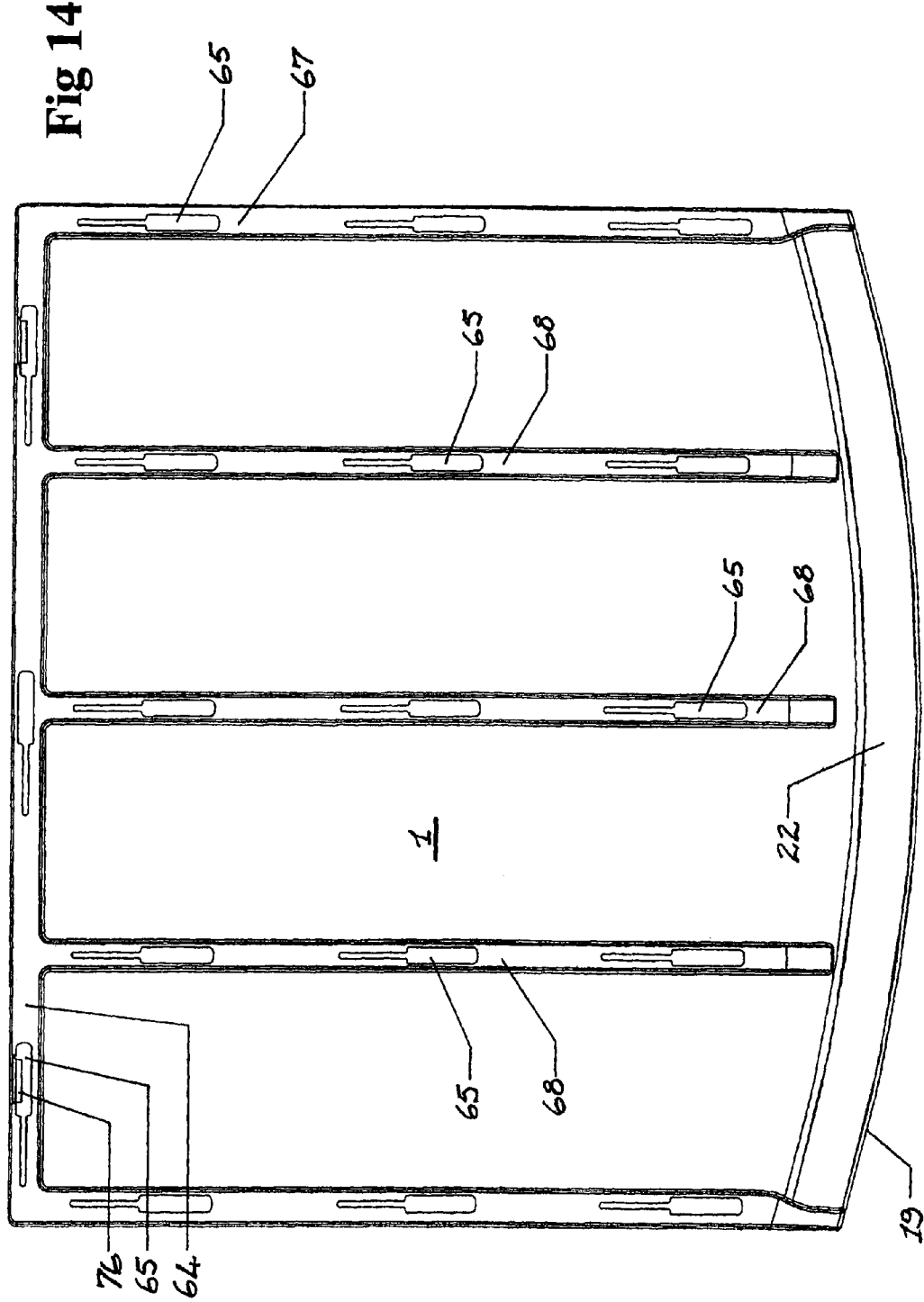

FILE STORAGE CABINET

CROSS REFERENCE TO RELATED APPLICATIONS

The present application is based on and claims the benefit of Australian provisional patent application Serial No. 2012900327, filed Jan. 27, 2012, the content of which is hereby incorporated by reference in its entirety.

The present application is a Section 371 National Stage Application of International Application No. PCT/AU2013/000056, filed Jan. 25, 2013, which is incorporated by reference in its entirety and published as WO 2013/110129 on Aug. 1, 2013, in English.

This invention relates generally to cabinets used to accommodate office files, catalogues, albums, directories or other book-like articles of physically larger form with their spines arranged in a vertical and readily accessible orientation. More specifically, it relates to such cabinets which are supplied in knocked-down form and readily assembled by a purchaser from more or less rigid components without the use of special tools.

In the storage or files, catalogues, albums, directories or other book-like articles of physically larger form to which frequent reference is required, it is convenient that they be supported in open cabinets with their spines exposed and orientated vertically in a position from which they may be readily identified, grasped and drawn out. Such mode of storage is preferred to the commonly used drawer-type file which does not provide such ready access. The term, open file cabinet, is used throughout herein to denote arrangements well known in the art and comprising, generally, a floor panel, side panels, a back panel, a roof panel and, as appropriate, vertically-arranged, intermediate divider panels positioned parallel to the side panels. The term, file, is used throughout herein to denote files, catalogues, albums, directories or other book-like articles of physically larger form.

Open file cabinets are commonly made from sheet metal, wood, polymers, reconstituted wood, pressed fibre board and corrugated cardboard. Examples are those taught by Jeter in U.S. Pat. Nos. 3,737,046, 5,797,665 and 6,056,377, which are made from folded sheet metal, assembled, as required, with suitable fasteners. Simple examples in wood or wood substitute materials are commonly made by joinery shops and are not represented in the patent literature. Corrugated cardboard articles exemplifying methods of construction which might be used in the making of open file cabinets are those taught by Blair in U.S. Pat. No. 4,080,023, Wright in U.S. Pat. No. 6,628,842 and Muscari in U.S. Pat. No. 4,506,790. While open file cabinets of sheet metal, wood or wood substitute materials are strong and robust and may be stackable, they are frequently of a utilitarian appearance inconsistent with the aesthetic of the modern office environment. They may also be heavy, with sharp edges and, where sold already made-up or assembled, may be bulky and inconvenient to handle. Where required to be assembled by a user, some skill in the use of tools is normally required. While cheap and easy to assemble, open file cabinets of corrugated cardboard are often of shoddy, insubstantial appearance and aesthetically unattractive. Their lightness renders them susceptible to damage and they tend to deteriorate rapidly in use. They are generally not stackable and frequently suffer from compression damage as a result of having heavy articles placed upon them.

The object of the present invention is to provide an open file cabinet which is of an aesthetically pleasing design; which is light and strong; which is easy to assemble without the use of tools; which is modular in arrangement, allowing common components to be incorporated into different configurations; which is stackable; which optionally incorporates a decoration system; which optionally has decoration applied to it; which optionally incorporates a labelling system; which optionally incorporates a closure; which permits articles stored in it to be readily identified, grasped and drawn out; and which may be used for the secure transport of files, catalogues, albums, directories or other book-like articles of physically larger form.

According to the present invention, an open file cabinet is provided comprising a floor panel, side panels, a back panel, a roof panel and vertically-arranged, intermediate divider panels positioned parallel to the side panels. The upper surface of said floor panel is shaped to engage and locate complementary lower edges of said side panels, back panel and divider panels. The inner surface of said back panel is shaped to engage and locate complementary inner edges of said side panels, floor panel, roof panel and divider panels.

The lower surface of said roof panel is shaped to engage and locate complementary upper edges of said side panels, back panel and divider panels. Said floor, side, back, roof and divider panels are preferably moulded from a suitable more or less rigid polymer material with stiffening ribbing provided where appropriate. Suitable attachment means are incorporated into said edges of said side and divider panels to co-operate with complementary attachment means of said floor, back and roof panels. A robust raised rail is provided at the rear edge of said floor panel to safely accommodate the impact of the lower edge of a file lodged energetically in said open file cabinet. The outer edges of said floor and roof panels are shaped to provide a pleasing appearance. A system of decoration is optionally moulded into the outer surfaces of said side panels. A system of decoration is optionally applied to the outer edges of said floor, roof, side and divider panels. A system of labelling is optionally applied to the outer edges of said roof, side or divider panels. The outer edges of said side and divider panels are suitably cut away to expose the spine regions of files and facilitate their being grasped and drawn out. The outer edge of said floor panel is made sloping to minimise any tendency to block files being offered up to said open file cabinet. Handles are optionally provided in the outer surfaces of said side panels to facilitate lifting of said open file cabinet and permit its use in the secure transport of files. A pivoting cover is optionally provided to close the open end of said open file cabinet and thereby protect files accommodated therein. The upper surface of said roof panel and the lower surface of said floor panel are provided with complementary shapings which engage during stacking and positively locate one said open file cabinet upon another. An increased number of said attachment means is optionally provided on said upper surface of said floor panel, inner surface of said back panel and lower surface of said roof panel to selectively engage and locate complementary edges of said divider panels in differing combinations of spaced relationship. Said floor, roof and back panels are optionally made in greater or lesser widths and said open file cabinets of greater or lesser width are assembled from them using standard side and divider panels. Trays to accommodate small stationery articles are optionally formed in the upper surface of said roof panel or fixed to the outer surfaces of said side panels. A linkage module is optionally provided to join together two said open file cabinets.

The various aspects of the present invention will be more readily understood by reference to the following description of preferred embodiments given in relation to the accompanying drawings in which:

FIG. 1 is a view of the upper surface of said floor panel of the present invention;

FIG. 2 is a view of a said divider panel of the present invention;

FIG. 3 is a view of the inner surface of said back panel of the present invention;

FIG. 4 is a view of the lower surface of said roof panel of the present invention;

FIG. 5 is a partial transverse cross-sectional view of an alternative embodiment of the present invention;

FIG. 6 is a fragmentary longitudinal cross-sectional view of the conjunction of a said divider panel with said back panel and said floor panel of the present invention;

FIG. 7 is a fragmentary transverse cross-sectional view of the conjunction of a said divider panel and said floor panel of one embodiment of the present invention;

FIG. 8 is a fragmentary transverse cross-sectional view of the conjunction of a said divider panel and said floor panel of another embodiment of the present invention;

FIG. 9 is a side view of an embodiment of the present invention incorporating a pivoting cover;

FIG. 10 is a fragmentary transverse cross-sectional view of the joining of a side panel to the back panel;

FIG. 11 is a fragmentary transverse cross-sectional view of the joining of a divider panel to the back panel;

FIG. 12 is a fragmentary side view of fixing means formed on the rear edge of a divider panel to fix the divider panel to the back panel;

FIG. 13 is a fragmentary face view of complementary fixing means formed on the inner surface of the back panel to fix a divider panel to the back panel;

FIG. 14 is a face view of the upper surface of an alternative embodiment of said floor panel of the present invention;

Figure 15:
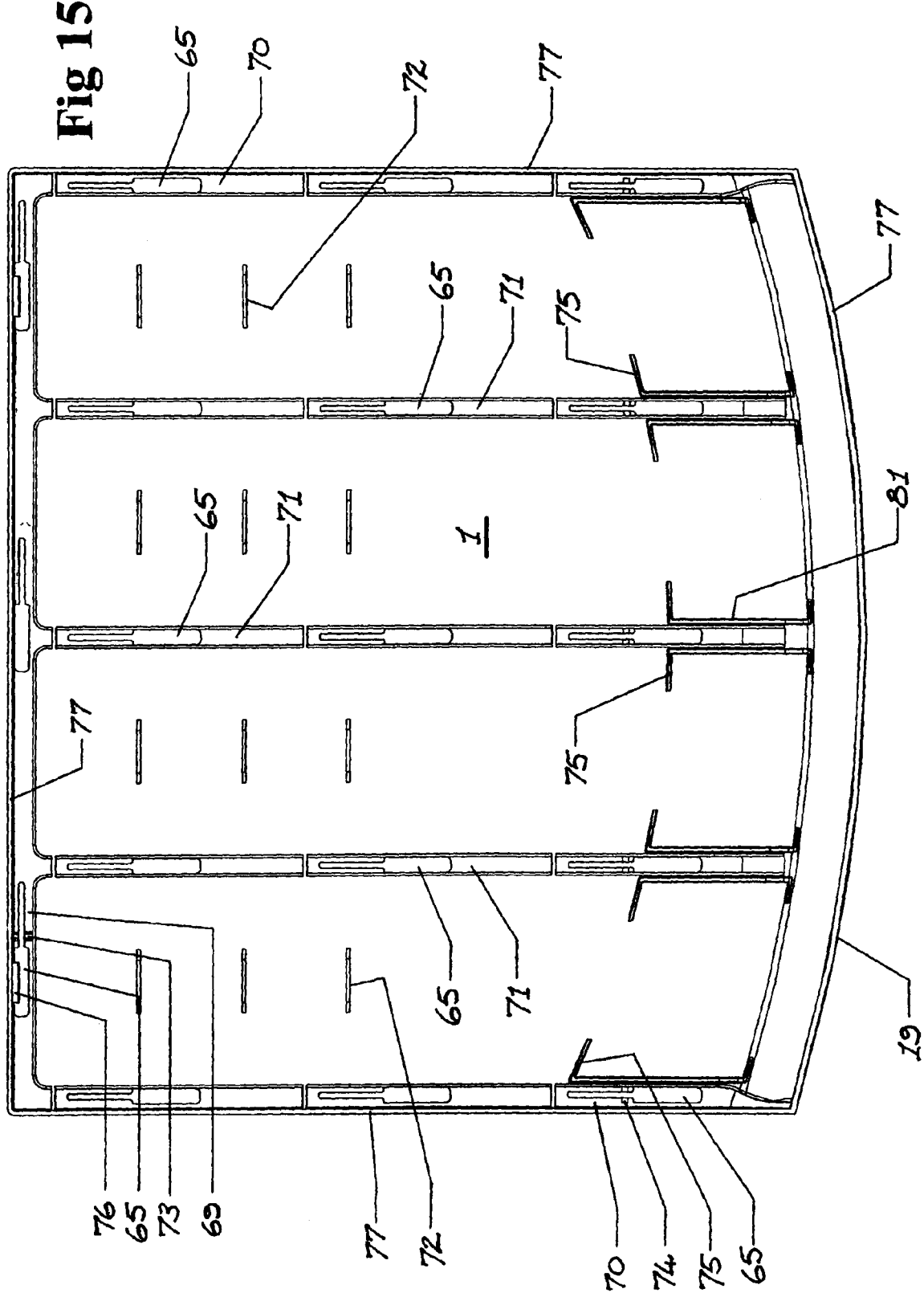
FIG. 15 is a face view of the under surface of the floor panel of FIG. 14.

The various figures are drawn to differing scales and no meaning or significance should be drawn from this. In the description and claims hereof, the words outer, outward, forward and front are intended to imply a direction towards to open front of said cabinet, while the words inner, rear, rearward and back are intended to imply a direction towards the closed back of said cabinet.

With reference to FIGS. 1, 2, 3 and 4, according to the, present invention, an open file cabinet is provided comprising floor panel 1, side panels 2 (depicted as 42 in FIGS. 5 and 9) fixed to attachment means provided along the side edges of said floor panel, back panel 3, roof panel 4 and a plurality of vertically-arranged, intermediate divider panels 2 positioned parallel to said side panels. With attachment means provided on their lower edges (not shown) fixed to complementary attachment means (position and arrangement indicated generally as 7) of said floor panel, said side panels are essentially of the same arrangement as said divider panels, but with apertures 5 and, optionally, ribbing 6 on one surface deleted. Aperture 5 is provided in said divider panels for the purpose of weight reduction. The unsupported, outer edges 31 of said side and divider panels are stiffened by outer edge ribs 30. Surface ribbing 6 is provided on both surfaces of said divider panels and, optionally, on one or both surfaces of said side panels and tapers from the edges of said outer edge rib to blend into the side surfaces of said side and divider panels, simultaneously serving the purpose of stiffening said unsupported edge of said side and divider panels and eliminating any tendency for said edge rib to block the movement of a file being withdrawn from said open file cabinet. That part of said floor panel projecting outwardly beyond the outer, lower edges of said divider panels is formed into apron 22 which slopes downwardly to a thin outer edge, said sloping surface minimising any impediment to movement of a file being offered up to said open file cabinet. The rear edge of said floor panel is provided with means 8 to index with and locate complementary lower edges 9 of said back panel. Attachment means (not shown) provided on the lower edges 11 of said divider panels are fixed to complementary attachment means (position and arrangement indicated generally as 10) provided on the upper surface of said floor panel. Attachment means (not shown) provided on the back edges (not shown) of said side panels and on the back edges 14 of said divider panels are fixed to complementary attachment means (position and arrangement indicated generally as 12, 13) provided on the inner surface of said back panel. Attachment means (not shown) provided on the upper edges of said side panels (not shown) and on the upper edges 15 of said divider panels are fixed to complementary attachment means (position and arrangement indicated generally as 16, 17) provided on the lower surface of said roof panel.

In the preferred embodiment, said floor, side, back, roof and divider panels are preferably moulded from a suitable, more or less rigid polymer material with stiffening ribbing provided where appropriate. In alternative embodiments (not shown), said panels are stamped or pressed from a suitable sheet polymer or sheet metal material, or moulded from a reconstituted wood material or cast from a suitable metal material.

A robust, raised rail 18 is provided at the rear edge of said floor panel to strengthen said rear edge such that it may safely accommodate the impact of the lower edge of a file (not shown) lodged energetically in said open file cabinet. In the preferred embodiment, the outer edge 19 of said floor panel and the outer edge 21 of said roof panel are shaped in complementary curves to provide a pleasing appearance. In alternative embodiments (not shown), said outer edges are made straight or in a symmetrical series of intersecting straight lines. In the preferred embodiment, a panel (not shown) is provided on the outer surfaces of said side panels (depicted as 42 in FIG. 9) to accommodated a system of decoration. Also in the preferred embodiment, a panel 20 is provided on sloping apron 22 to accommodate the manufacturer's branding or other system of decoration. Said panel is optionally made slightly recessed to accommodate a decal, stick-on label or the like.

With additional reference to FIGS. 6, 7, 10 and 11, in an embodiment of the present invention permitting ready disassembly, said side panels and divider panels 2 are made with integral top 29, inner 28 and lower 23 edge ribs. Said edge ribs are made with more or less the same width as outer edge rib 30. Fixed to said top, inner and lower edge ribs is a plurality of attachment lugs 26 having integral caps 27 formed on their outer ends. Said floor, back and roof panels are provided with raised attachment rails 10, 13, 17, said attachment rails each having a surface which abuts said edge ribs of said side and divider panels. Formed in said abutting surfaces of said attachment rails are keyhole-type attachment apertures complementary to said attachment lugs. Said keyhole-type attachment apertures are well known in the art, each comprising a larger aperture through which said head of a said attachment lug is free to pass and a slot-type aperture extending therefrom of a width just sufficient to accommodate said attachment lug. With said head entered through said larger aperture and said attachment lug displaced longitudinally into said slot-type aperture, said head is, effectively captured, retaining it in place together with said lug and the parent component upon which said lug is formed. To assemble said open file cabinet, said side and divider panels are placed on said floor panel and their attachment lugs 26, 27 engaged with and captured in attachment apertures 24, 25 of said floor panel. In the preferred embodiment, said attachment lugs are captured by displacing said side and divider panels rearwardly. With said side and divider panels fixed to said floor panel, attachment apertures 32, 33 of said back panel are engaged with attachment lugs 34 provided on back edge ribs 28 of said side and divider panels and said attachment lugs captured by downwardly displacing said back panel such that its lower edge 9 fully engages recess 8 provided at the rear edge of said floor panel. Engagement of said back panel lower edge with said recess serves to restrain said side and divider panels from outward displacement which might disengage their said attachment lugs from said floor panel. With said back panel fixed to said inner edges of said side and divider panels, attachment apertures (not shown) of said roof panels are engaged with attachment lugs (not shown) provided on top ribs 29 of said side and divider panels. In the preferred embodiment, said attachment lugs are captured by displacing said roof panel rearwardly such that short, raised, rounded edges 36 provided on the inner surface of said roof panel 'click' over the inner edges of attachment channels 12, 13 of said back panel, thereby securing said roof panel in place. Said open file cabinet is disassembled by reversing said assembly sequence.

With additional reference to FIG. 8, in an embodiment of the present invention not permitting ready disassembly, said open file cabinet is assembled by fixing the edges of said side and divider panels to said floor, back and roof panels by pressing a plurality of split, shouldered attachment plugs provided along said edges through attachment apertures provided in raised attachment channels 10, 13, 17. As depicted in FIG. 8, split, shouldered attachment plugs 37 are provided along lower edge rib 23. Complementary attachment apertures 38 are provided along attachment channel 10. Pressing of said attachment plugs fully through said attachment apertures results in shoulders 40 of said attachment plugs elastically engaging the inner edge of said attachment channel and, thereafter, cannot be withdrawn.

With reference to FIG. 5, in an alternative embodiment, floor panel 1 is raised above a supporting surface on flanged edge 41 and the lower edges of side panels 42 and divider panels 2 are fixed to it by a plurality of attachment lugs 26 with integral caps 27 (as described in relation to FIGS. 6 and 7) are engaged with keyhole-type attachment apertures provided in said floor panel. An advantage of this embodiment is the fact that additional rows of said attachment apertures may optionally be provided in said floor panel to permit selective positioning of said divider panels.

In an alternative embodiment (not shown), the edges of said side and divider panels are bonded to said floor, back and roof panels using a suitable quick-setting adhesive. In this embodiment, short spigots are provided on the edges of said side and divider panels to index with complementary apertures provided in said floor, back and roof panels to locate said side and divider panels during said bonding process. In another alternative embodiment (not shown), the edges of said side and divider panels are fixed to said floor, back and roof panels using suitable screw fastenings passing through suitably located apertures in said floor, back and roof panels. Suitable bosses (depicted in broken line as 48 in FIG. 7) are provided along the edges of said side and divider panels to accept said screw fastenings. Obviously, attachment channels 10, 13, 17 (as depicted in FIGS. 1, 3 and 4) may be made deeper or shallower, or deleted completely, according to the method employed to fix said side and divider panels to said floor, back and roof panels. In an alternative embodiment (not shown), said attachment channels are lowered instead of raised and serve to accommodate and locate the edges of said side and divider panels.

With reference again to FIGS. 2 and 9, in the preferred embodiment, the upper parts of outer edges 31 of said side and divider panels are substantially cut away to expose the spine regions of files stored in said open file cabinet, thereby facilitating their being grasped for withdrawal. In alternative embodiments (not shown), outer edge 31 of said side and divider panels are made straight and aligned more or less normal to the supporting surface, suitably located, localised cutaways being provided to expose the spine regions of files stored in said open file cabinet and thereby facilitating their being grasped for withdrawal. In other alternative embodiments (not shown), the surface of said floor panel is made to slope downwardly towards the front to facilitate withdrawal of files stored in said open file cabinet, or downwardly towards the rear to better retain files stored in said open file cabinet.

In another alternative embodiment (not shown), handles are optionally provided in the outer surfaces of said side panels to facilitate lifting of said open file cabinet. Said handles are preferably arranged to facilitate lifting of said open file cabinet with said back panel orientated downwardly, thereby permitting the use of said open file cabinet for the secure transport of files. In another alternative embodiment, said handles are fixed to suitable plates and said plates are temporarily fixed to the outer surfaces of said side panels using attachment lugs with integral caps (generally of the type depicted as 26, 27 and described in relation to FIGS. 6 and 7) or other suitable fastenings. In this embodiment, said handles are optionally fixed in positions permitting said open file cabinet to be lifted in its normal upright orientation or with said back panel orientated downwardly.

With reference to FIG. 9, said open file cabinet is optionally provided with a pivoting cover 43 to protect files stored in it. Said cover is provided with lugs or rollers (position indicated as 44) which travel along tracks 45 formed in the external surfaces of side panels 42 as said cover is lifted. Suitable detents (not shown) are provided at the inner ends of said tracks to locate said cover in its opened position, the weight of said cover being supported at said detents and along the intersection of said roof and back panels. A suitable lifting handle 46 is provided on said cover. The closed position of said cover is depicted in broken line as 47. The lower edge of said cover is preferably cut away to accommodate apron 22 (as depicted in FIG. 1).

In an alternative embodiment (not shown), the free edges of said side panels are made straight and a single cover is provided pivoting from the front edge of said roof panel. A suitable lifting handle is provided on said cover, together with suitable means to support said cover in its opened position. In another alternative embodiment (not shown), the free edges of said side panels are made straight and two covers are provided pivoting from the front edge of said side panels. Suitable lifting handles are provided on said covers. All said covers are optionally provided with suitable means to lock them in their closed positions.

With reference to FIG. 10, in an alternative embodiment, back edge ribs 28 of side panels 42 are fixed to back panel 3 by a plurality of claws 51 engaging the inside edges of said ribs. Said claws are provided in suitably located rows adjacent the side edge of said back panel. Where said embodiment is employed, for positive locational purposes, suitable dowels (not shown) are preferably provided on the external surfaces of said ribs and engage suitable complementary apertures (not shown) provided in said back panel.

With reference to FIG. 11, in an alternative embodiment, back edge ribs 28 of divider panels 2 are fixed to back panel 3 by a plurality of claws 52, 53 engaging both edges of said ribs. Preferably, said claws are arranged in suitably located, parallel rows and positioned alternately. In an alternative embodiment, said claws are positioned in opposed pairs. Obviously, a similar arrangement may be readily adapted to fix any panel of the present invention to any other panel.

With reference to FIGS. 12 and 13, back edge ribs 28 of divider panels 2 are fixed to back panel 3 by locating splines 56 formed on the outer surface of said back edge ribs engaging channels 59 between suitably located pairs of rails 54, 55 formed on the inner surface of said back panel. The depth of said locating splines is slightly less than the depth of said channels and the thickness of said splines is such as to permit them to make a light press fit with said channels. Formed along one side of said locating splines are suitably located first pairs of approximately semi-cylindrical shapings 60, 61, one concave and the other convex. Formed on the other side of said splines immediately opposed to said first pairs of shapings are second pairs of approximately semi-cylindrical shapings (not shown) of opposite sense such that convex shapings 60 are each opposed by a concave shapings and concave shapings 61 are each opposed by a convex shaping. Formed along one side surface of channels 59 are suitably located first pairs of approximately semi-cylindrical shapings 57, 58, one concave and the other convex, said pairs of shapings being complementary to shapings 60, 61 of said locating splines. Formed on the adjacent side surface of said channels in immediate opposition to said first pairs of shapings are second pairs of approximately semi-cylindrical shapings 62, 63 of opposite sense such that concave shapings 57 are opposed to convex shapings 62 and convex shapings 58 are opposed to concave shapings 63. In the preferred embodiment, said semi-cylindrical shapings of said locating splines and said channel are made such that the diameter of an approximate cylinder to which their surfaces conform increases slightly towards the bottoms of said channels or the free ends of said locating splines. In the preferred embodiment, said taper falls in the range 1.0 to 4.0 degrees. In operation, the free ends of said locating splines are offered up to said channels and said splines are pressed into place in said channels, said complementary shapings of said locating splines engaging said complementary shapings of said channels. As the free ends of said shapings of said locating spline are slightly larger in diameter than the outer ends of said shapings of said channels, rails 54, 55 are elastically deflected apart to permit engagement of said locating spline shapings with said complementary shapings of said channel sides. Obviously, for said deflecting apart to occur, said back panel and said rails must be made from a suitable, stiffly elastic material. When said locating splines are fully seated in said channels, said locating spline shapings and said channel side shapings are in perfect complementarity and the combination acts to provide a strong attachment.

In an alternative embodiment (not shown), said shapings of said rails take the form of a plurality of suitably spaced, opposed, semi-cylindrical concavities and said shapings of said locating spline take the form of complementary opposed, semi-cylindrical convexities. In this embodiment, said concavities and convexities are made slightly tapered in the manner described.

In the preferred embodiment, the upper surface of said roof panel and the lower surface of said floor panel are provided with complementary shapings (not shown) which engage during stacking and positively locate one said open file cabinet upon another. In another alternative embodiment (not shown), said floor, back and roof panels are optionally made in greater or lesser widths and differing configurations of said open file cabinet of greater or lesser width are assembled from them using standard forms of said side and divider panels.

In an alternative embodiment (not shown) where said open file cabinets are not to be stacked, trays to accommodate small stationery articles are optionally formed in the upper surface of said roof panel. In another alternative embodiment (not shown), trays to accommodate small stationery articles are optionally fixed to the external surfaces of said side panels.

In an alternative embodiment (not shown), a linking module is optionally provided to join together two said open file cabinets. Said linking module comprises narrow floor, back and roof panels having a width of one file compartment of said open file cabinet, a plurality of attachment lugs 26 with integral caps 27 (as described in relation to FIGS. 6 and 7) being provided along their side edges. Said attachment lugs and caps are engaged with complementary keyhole-type attachment apertures provided in the adjacent side edges of said floor, back and roof panels of two said open file cabinets, thereby joining them together to effectively create a single wider unit.

In an alternative embodiment (not shown), in order to provide a neater appearance, said attachment lugs are deleted from the back edges of side panels. In another alternative embodiment (not shown), said side panels are provided with skirts of suitable width positioned around their upper, back and lower edges to cover the normally exposed edges of said floor, back and roof panels. In another alternative embodiment (not shown), labels are provided above each compartment of a said open file cabinet, said labels being pivotally supported from the outer edge 21 of said roof panel and adapted to be deflected upwardly to facilitate removal of files. In another alternative embodiment (not shown), said labels are pivotally supported from the front edges of said side and divider panels. In another alternative embodiment (not shown), said labels are carried in holders formed in or applied to apron 22 (as depicted in FIG. 1).

In an alternative embodiment (not shown), suitably shaped coloured strips of a suitable material are clipped to the outer edges of said side, divider and roof panels for the purpose of decoration.

With reference again to FIG. 7, a flat exterior surface is provided in a panel having raised attachment channels 10, 13, 17 (as depicted in FIGS. 1, 3 and 4) by bonding an exterior skin 49 to the outer surface of said panel, said skin preferably being located by a raised edge 50 provided around the periphery of said panel.

Figure 21:
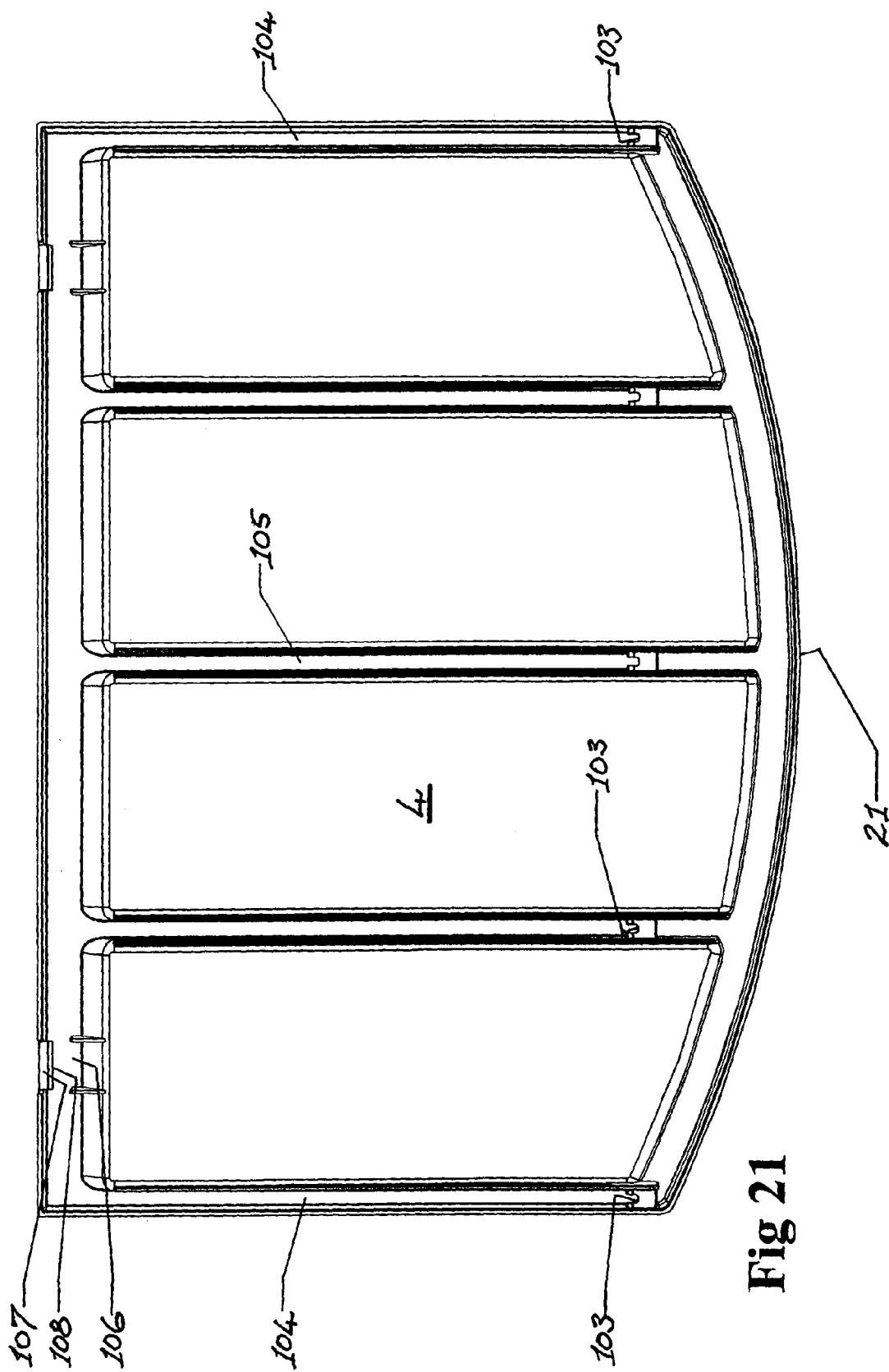
FIG. 21 is a face view of the under surface of an alternative embodiment of said roof panel of the present invention.
Figure 22:
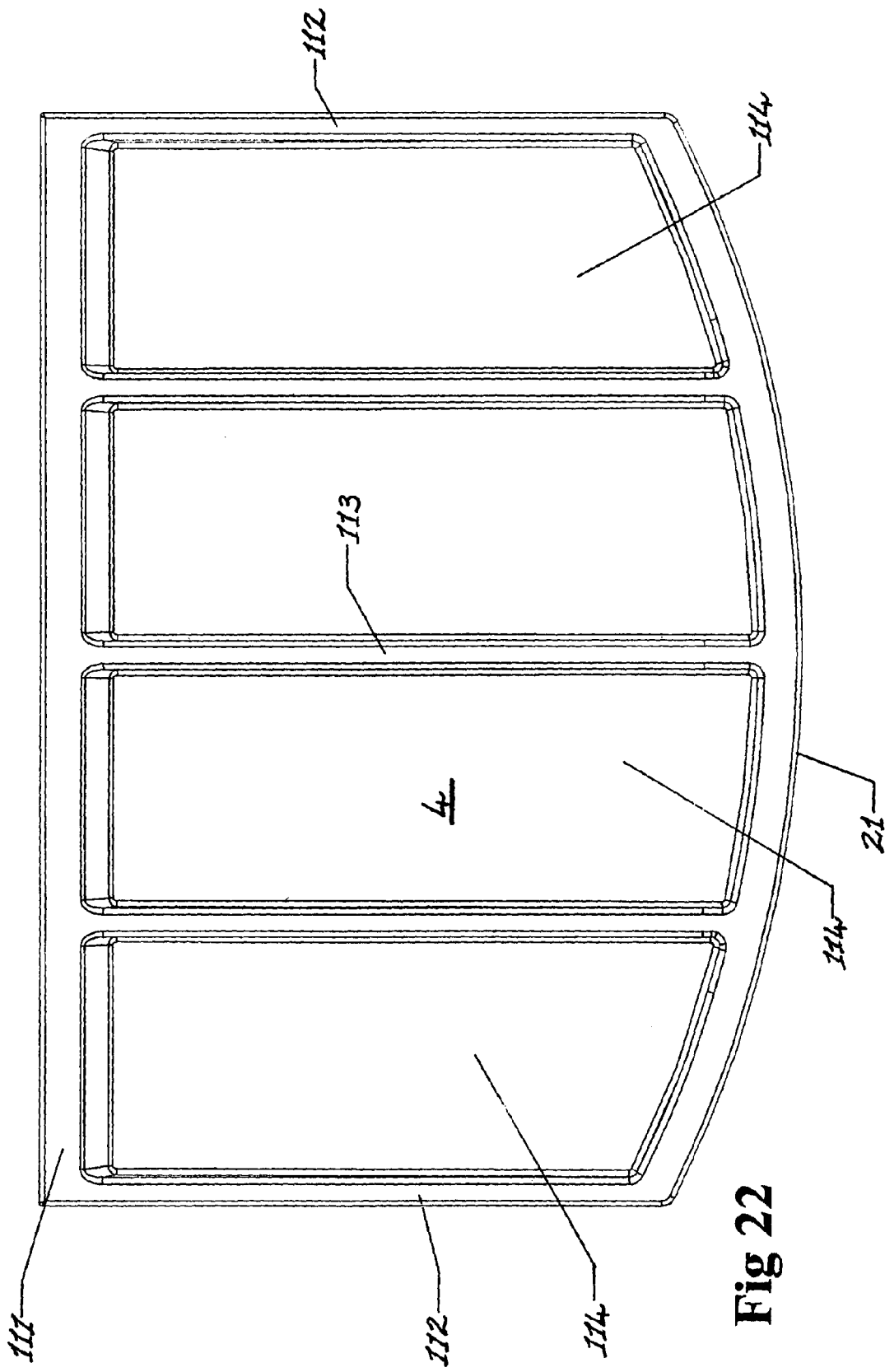
FIG. 22 is a face view of the upper surface of the roof panel of FIG. 21.
Figure 23:
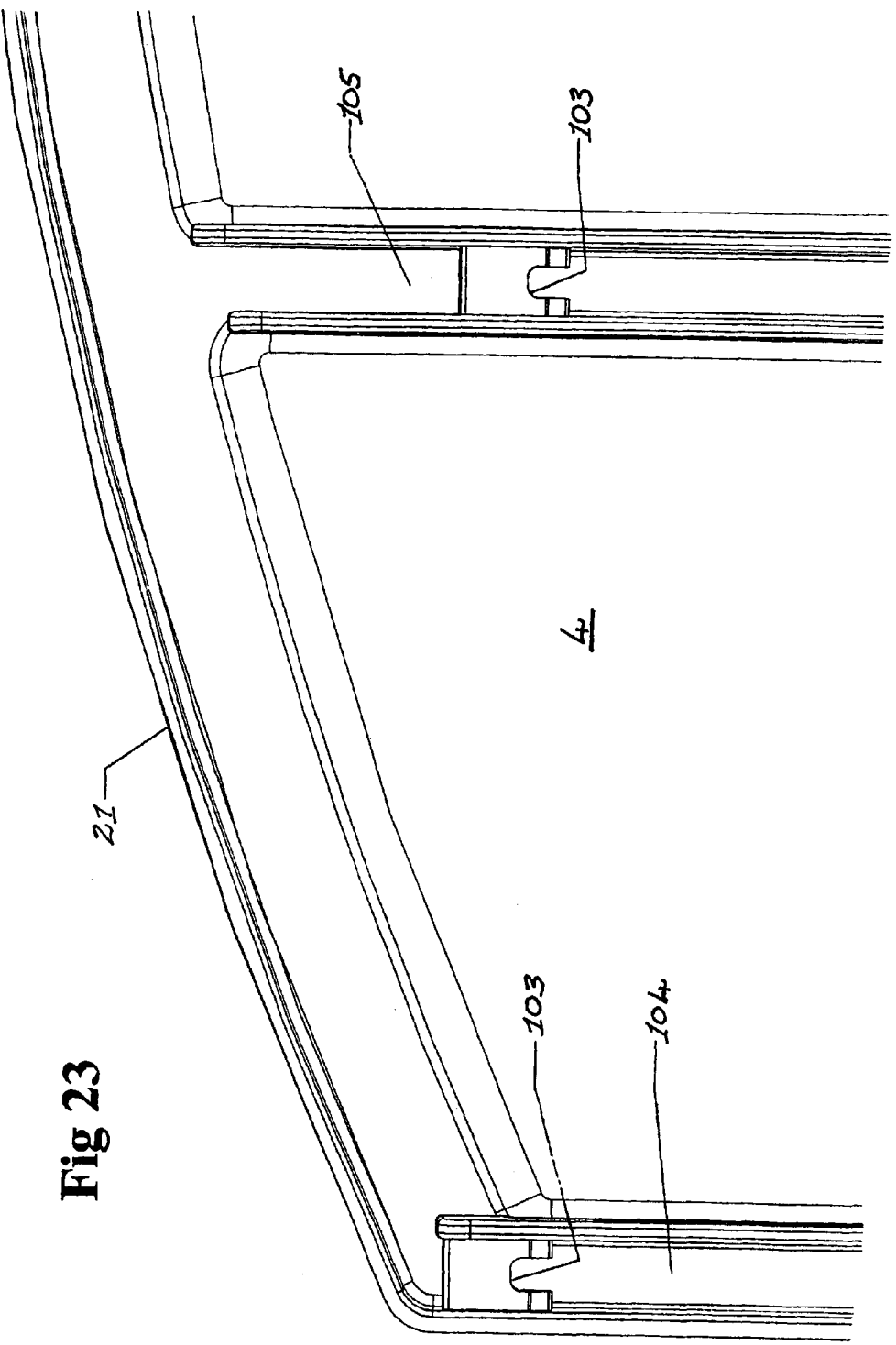
FIG. 23 is a fragmentary face view of the outer side part of the roof panel of FIG. 21.
Figure 24:
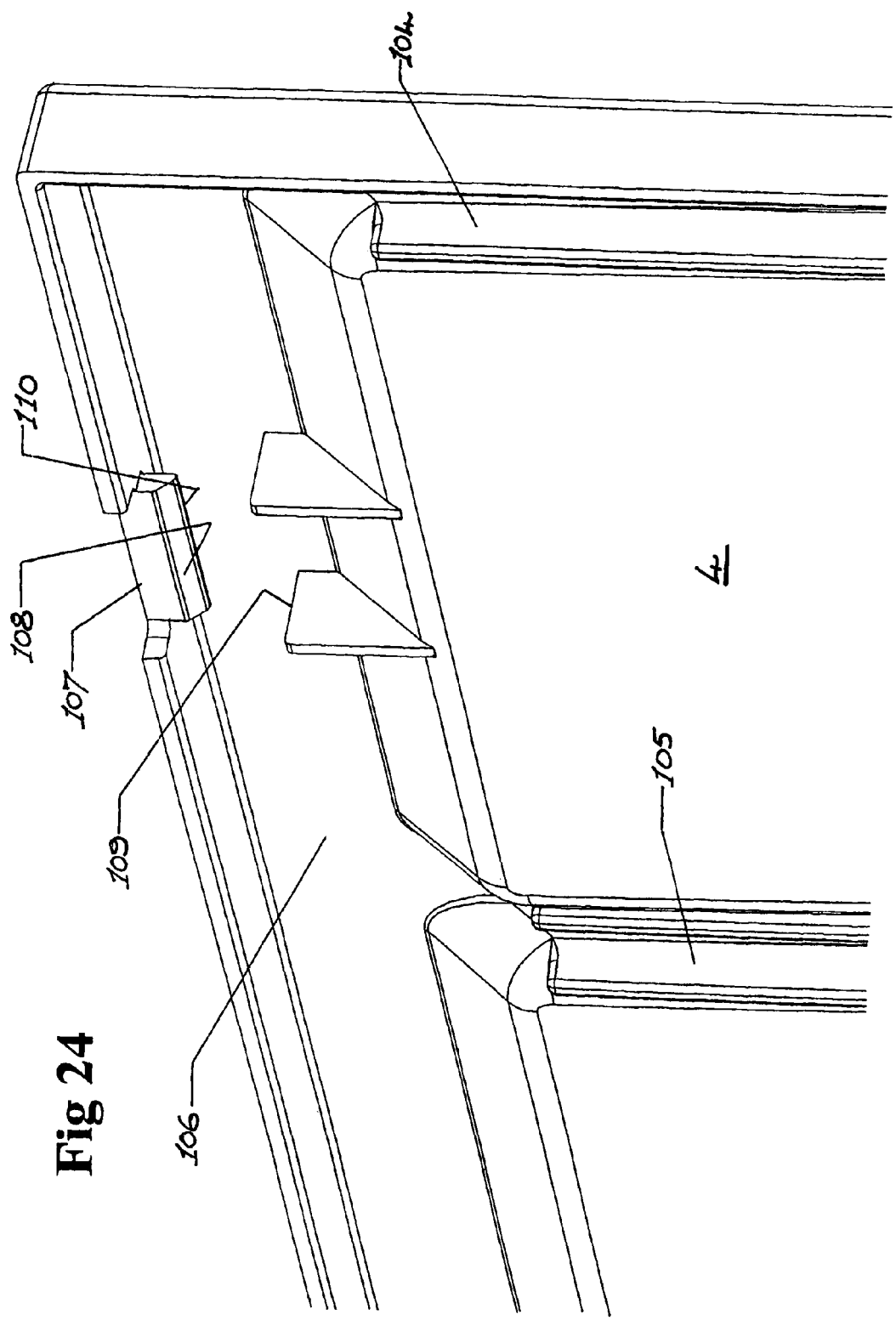
FIG. 24 is a fragmentary perspective view of the inner side part of the roof panel of FIG. 21.

With reference to FIG. 14, in an alternative embodiment, floor panel 1 is provided with raised, parallel attachment rails 67 along its side edges, parallel attachment rails 68 positioned intermediately to them and attachment rail 64 along its inner edge, said attachment rails each having a surface abutted, respectively, by the lower edge ribs of said side, divider and back panels. Formed in said abutting surfaces of said attachment rails are keyhole-type attachment apertures 65 complementary to attachment lugs formed on said lower edge ribs of said side, divider and back panels. Said keyhole-type attachment apertures are well known in the art, each comprising a larger aperture through which the expanded head of a said attachment lug (depicted as 80 in FIG. 19) is free to pass and a slot-type aperture extending therefrom of a width just sufficient to accommodate said attachment lug (depicted as 79 in FIG. 19). With said attachment lug head entered through said larger aperture and said attachment lug displaced longitudinally into said slot-type aperture, said head is, effectively captured, retaining it in place together with said lug and the parent component upon which said lug is formed. In the preferred embodiment, the outer edge 19 of said floor panel and the outer edge of said roof panel (depicted as 21 in FIGS. 21 and 22) are shaped in complementary curves to provide an aesthetically pleasing appearance. In alternative embodiments (not shown), said outer edges are made straight or in a symmetrical series of intersecting straight lines. The outer, upper surface of said floor panel is formed into apron 22 which slopes downwardly to a thin outer edge, said sloping surface minimising any impediment to movement of a file being offered up to said open file cabinet. In the preferred embodiment, a suitable panel (not shown) is provided on sloping apron 22 to accommodate the manufacturer's branding or other system of decoration. Said panel is optionally made slightly recessed to accommodate a decal, stick-on label or the like.

Figure 16:
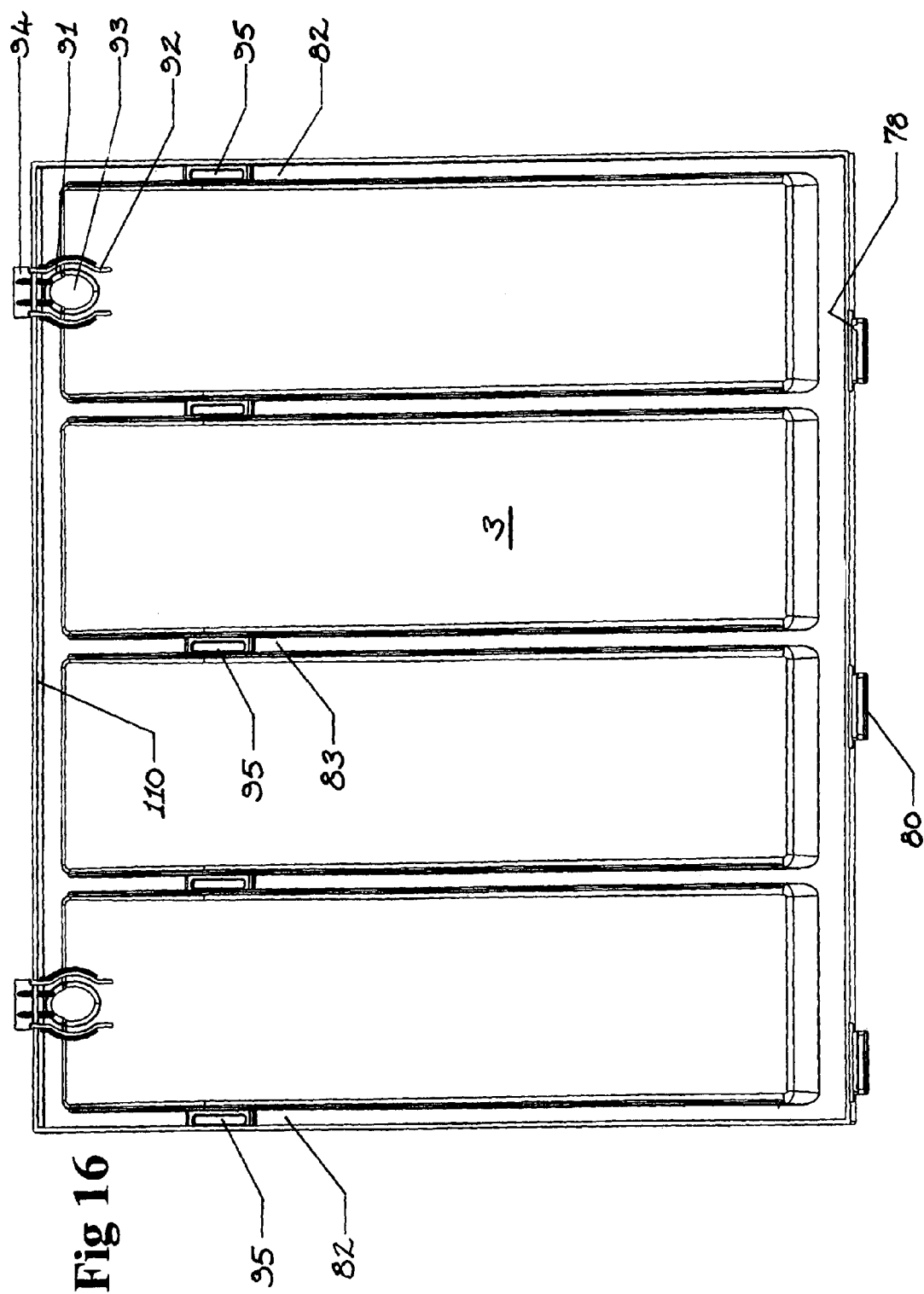
FIG. 16 is a face view of the internal surface of an alternative embodiment of said back panel of the present invention.
Figure 17:
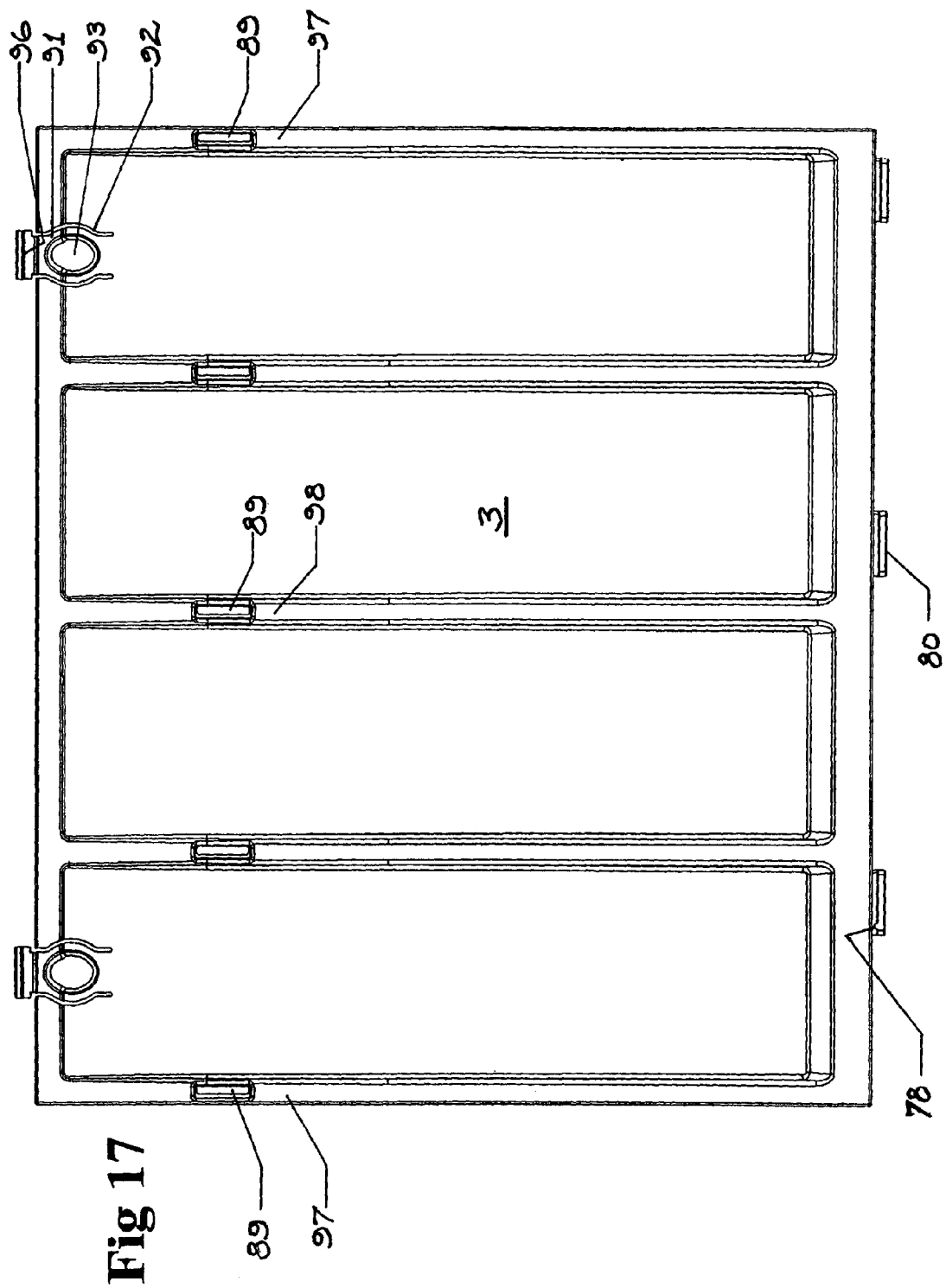
FIG. 17 is a face view of the external surface of the back panel of FIG. 16.

With additional reference to FIG. 15, said floor panel is raised slightly above a supporting surface by continuous flange 77 passing completely around its lower, outer edge. A plurality of shallow, transverse, downwardly projecting webs 72 is provided on the underside of said floor panel, said webs contacting a supporting surface and, thereby, acting to support the generality of said floor panel against loadings applied to it. Channels 69, 70, 71 in the underside of said floor panel are generated as a result of the formation of said attachment rails. Webs 115 passing transversely across said channels are provided to confer added stiffness. Small concavities 73, 74 arranged transversely to the narrow parts of some or all keyhole-type attachment apertures 65 are provided to engage small complementary convexities (depicted as 78 in FIG. 19) provided on the upper surfaces of the heads of attachment lugs (depicted as 80 in FIG. 19), said complementary shapings providing a positive 'click' engagement when said attachment lugs are properly engaged with said keyhole-type attachment apertures. A plurality of shallow, arcuately-arranged, downwardly projecting webs 75 is provided on the underside of said floor panel, said webs being positioned to engage the outer edge of the roof panel (depicted as 21 in FIGS. 21 and 22) of a said file cabinet below when two or more said file cabinets are in stacked arrangement. In the preferred embodiment, said arcuately-arranged webs are made with forwardly extending parts 81 which act to stiffen the cantilevered outer part of said floor panel when said file cabinets are in stacked arrangement. With reference to FIGS. 16 and 17, back panel 3 is made with two or more attachment lugs 84 formed along its lower edge rib, said attachment lugs being complementary to keyhole-type attachment apertures 65 provided along the rear edge of floor panel 1. Said back panel is fixed to said floor panel by entering the heads of said attachment lugs through said larger parts of said attachment apertures and then displacing said back panel laterally in the appropriate sense such that said heads of said attachment lugs are captured beneath said narrow parts of said attachment apertures. Small convexities 84 are provided on the upper surfaces of some or all of the heads of said attachment lugs, said convexities engaging small complementary concavities provided transversely to said keyhole-type attachment aperture narrow parts (depicted as 73 in FIG. 15), said complementary shapings providing a positive 'click' engagement when said attachment lugs are properly engaged with said keyhole-type attachment apertures.

Figure 18:
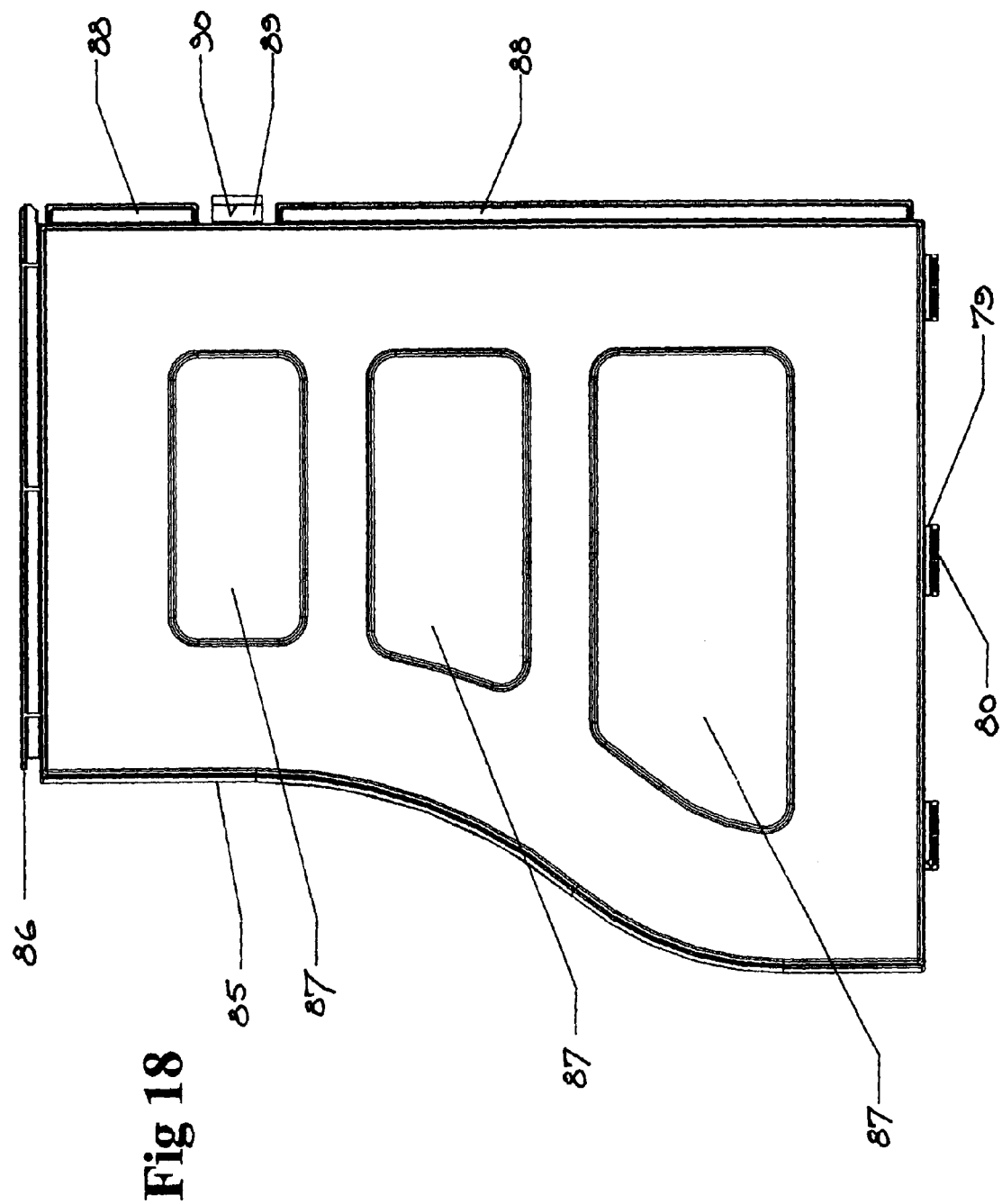
FIG. 18 is a face view of an alternative embodiment of a divider or side panel of the present invention.
Figure 19:
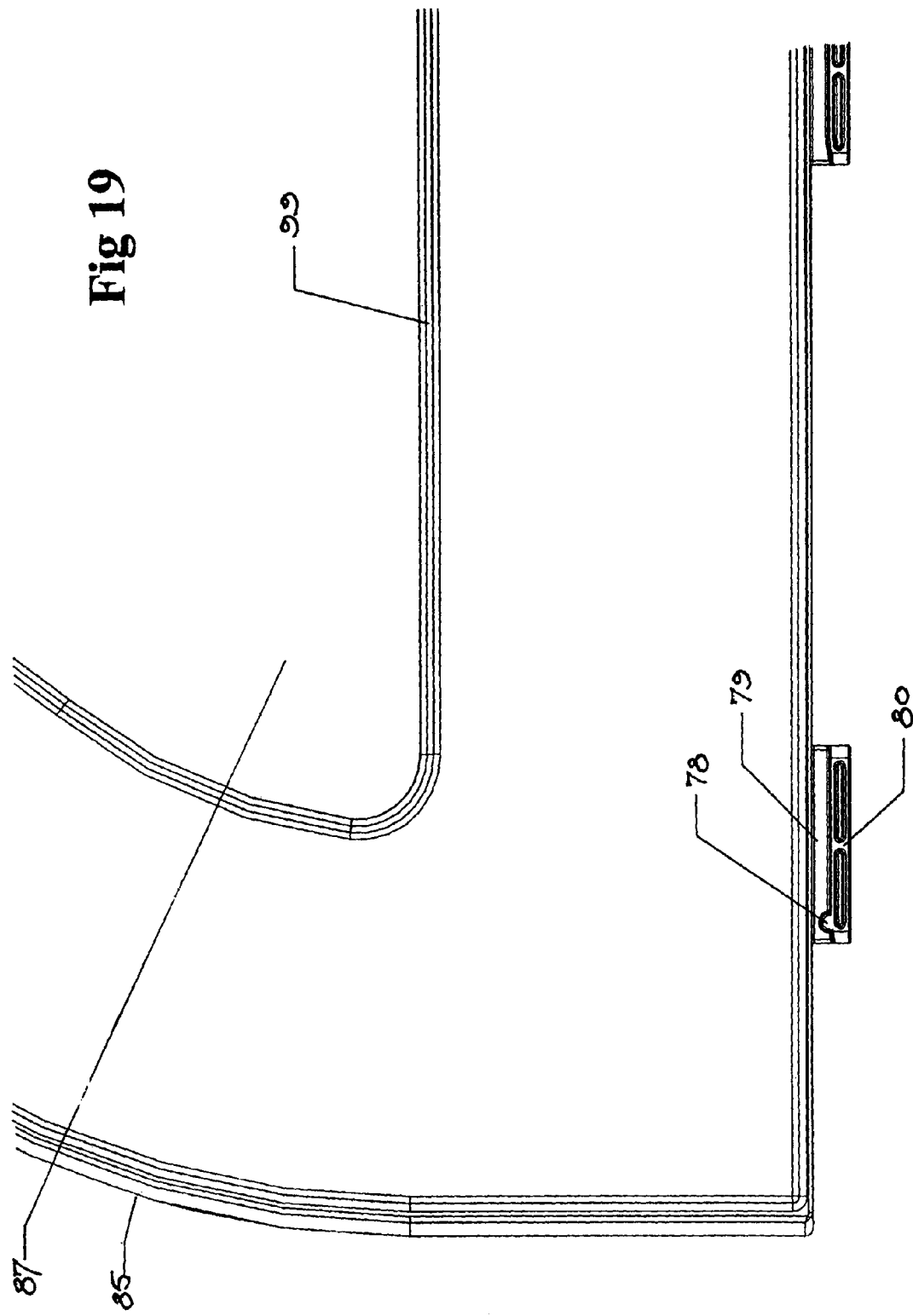
FIG. 19 is a fragmentary face view of the outer, lower part of the divider or side panel of FIG. 18.
Figure 20:
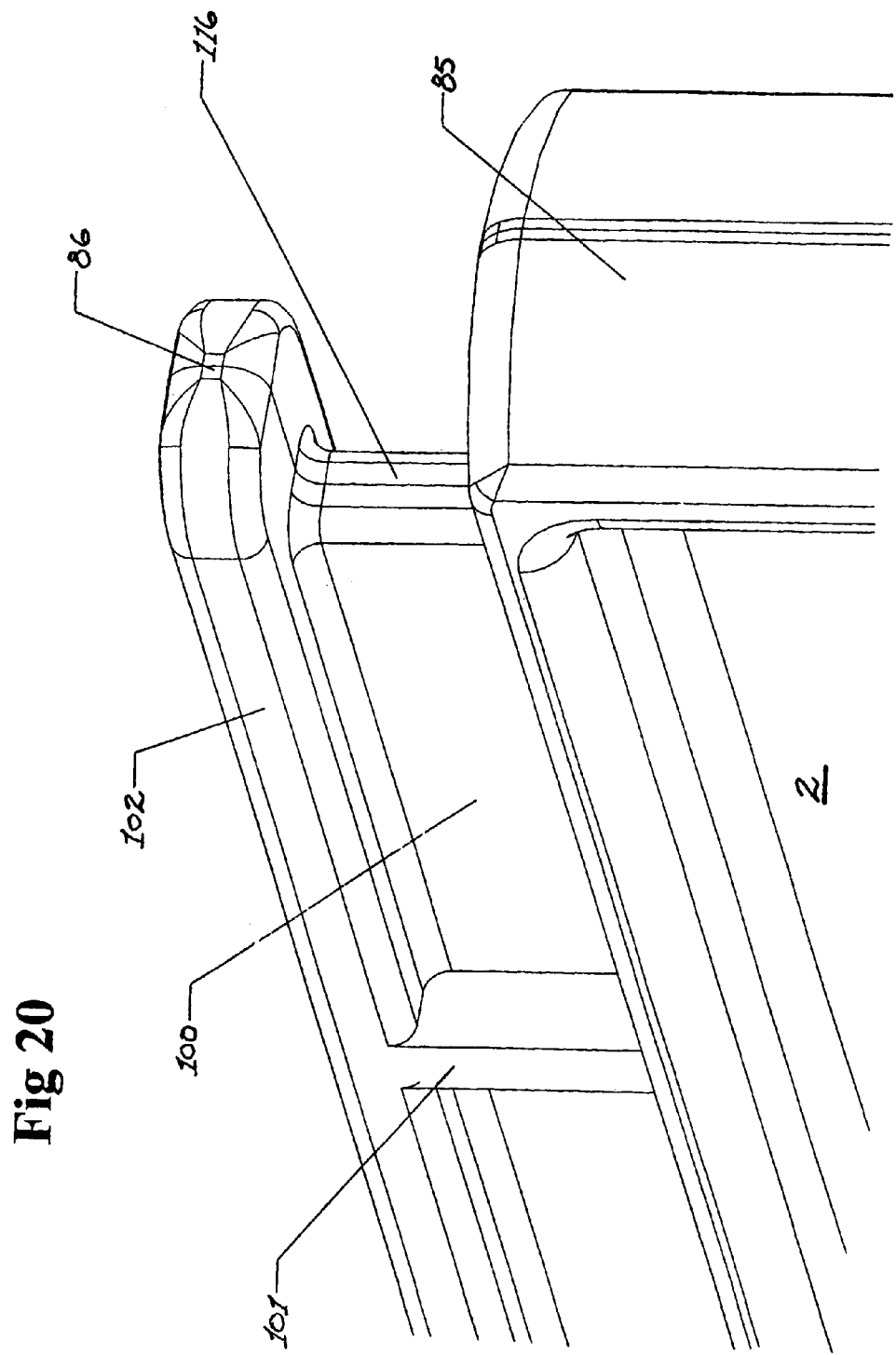
FIG. 20 is a fragmentary perspective view of the outer, upper part of the divider or side panel of FIG. 18.

With additional reference to FIGS. 18 and 19, dividers and side panels 2 are made identical. Suitable apertures 87 are provided in said dividers and side panels for weight-reduction purposes. Ribbing 99 is provided around the edges of said apertures to improve stiffness. The outer edges 85 of said dividers and side panels are optionally made with suitable cut-aways (not shown) to facilitate grasping of files within said file cabinet or are made straight or in the form of the aesthetically pleasing ogee shape depicted. Said dividers and side panels are each made with two or more attachment lugs 83 formed along their lower edge ribs, said attachment lugs being complementary to keyhole-type attachment apertures 65 provided along raised, parallel attachment rails 67, 68 of floor panel 1. Said dividers and side panels are fixed to said floor panel by entering the heads of said attachment lugs through said larger parts of said attachment apertures and then displacing said dividers and side panels rearwardly such that said heads of said attachment lugs are captured beneath said narrow parts of said attachment apertures. Some or all of said attachment lugs and apertures are made with said small complementary concavities and convexities of the type and functionality previously described. Said back panel is made with parallel, vertically-arranged edge channels 82 and intermediate channels 83 formed on its inner surface, said channels being positioned coincidently with attachment rails 67, 68 of said floor panel. Channels 82, 83 in said back panel are adapted to receive the inner edge ribs of said dividers and side panels when said dividers and side panels are properly fixed to said floor panel. Apertures 95 are provided in the upper parts of channels 82, 83. Clawed tabs 89 formed on the inner edges of said dividers and side panels extend through said apertures when said dividers and side panels are properly fixed to said floor panel, claws 90 of said tabs being elastically deflected by, and then engaging the outer surfaces of, the edges of said apertures. The engagement of said claws with said back panel positively secures said dividers and side panels to said back panel and said dividers and side panels may only be removed by deflecting tabs 89 laterally to release said claws from their engagement with said outer surface edges of said apertures, thereby permitting said tabs to be withdrawn through apertures 95. Raised rails 97, 98 are generated on the outer side of said back panel as a result of the formation of channels 82, 83. One or more sprung tabs 91 are provided on the upper edge of said back panel, said tabs being separated from said back panel by slots 92. The upper free ends 94 of said sprung tabs are provided with claws 96 adapted to engage complementary strikers on said roof panel when said roof panel is properly assembled onto said dividers and side panels and said back panel, thereby securing said roof panel in place. Pads 93 are formed on said sprung tabs to facilitate the application of finger pressure to said tabs to deflect them and, thereby, to release the engagement of claws 96 with said complementary surfaces and permit the disengagement and removal of said roof panel.

With additional reference to FIGS. 20, 21, 23 and 24, dividers and side panels 2 are made with a horizontal rib 102 along their upper edges, said rib being supported on web 100 having more or less the same thickness as the generality of said dividers and side panels, said web being stiffened by a plurality of intermediate stiffening bars 101. The outer end of rib 102 is formed into projecting toe 86. Formed on the underside of said roof panel are edge channels 104 and intermediate channels 105. Arranged in a transverse line and located in said channels towards their outer ends are anchor lugs 103. Said anchor lugs are made to accommodate toes 86 between said anchor lugs and the underside of said roof panel, the outer edge 116 of each web 100 immediately beneath said toes preferably being captured in a notch provided in the inner edge of each said anchor lugs. Said roof panel is assembled to said dividers and side panels and said back panel by offering up to and capturing toes 86 beneath said anchor lugs. Said offering up is conveniently performed by tilting said roof panel upwardly at the inner end to permit the engagement of said toes with said anchor lugs to be observed. With said engagement visually confirmed, said roof panel is lowered to a horizontal position while urging it inwardly to effect full engagement of said toes with said anchor lugs. Lowering of said roof panel to a horizontal position causes ribs 102 of said dividers and side panels to enter channels 104, 105. on the underside of said roof panel and rib 110 formed on the upper edge of said back panel to enter channel 106 at the underside inner edge of said roof panel. Simultaneously, the upper ends 94 of sprung tabs 91 are elastically deflected forwardly (towards the outer edge of said roof panel) by claws 96 contacting angled edges 108 of strikers 107 formed at the inner edge of said roof panel, said claws riding over and engaging the edges of said strikers. One or more buttresses 109 are provided on the underside of said roof panel immediately outwardly (towards the outer edge of said roof panel) of sprung tabs 91 in their positions of engagement with strikers 107, said buttresses acting to limit the elastic deflection of said sprung tabs when finger pressure is applied to pads 93. Removal of said roof panel is effected by a reversal of said sequence, commencing with the releasing of claws 96 from striker edges 110 by the application of finger pressure to pads 93. With additional reference to FIG. 22, raised rails 111, 112, 113 are generated on the upper surface of said roof panel as a result of the formation, respectively, of channels 106, 104, 105 on the underside of said roof panel. Areas 114 between raised rails 111, 112, 113 on the upper surface of said roof panel conveniently serve as trays to accommodate small stationery articles and the like.

Figure 25:
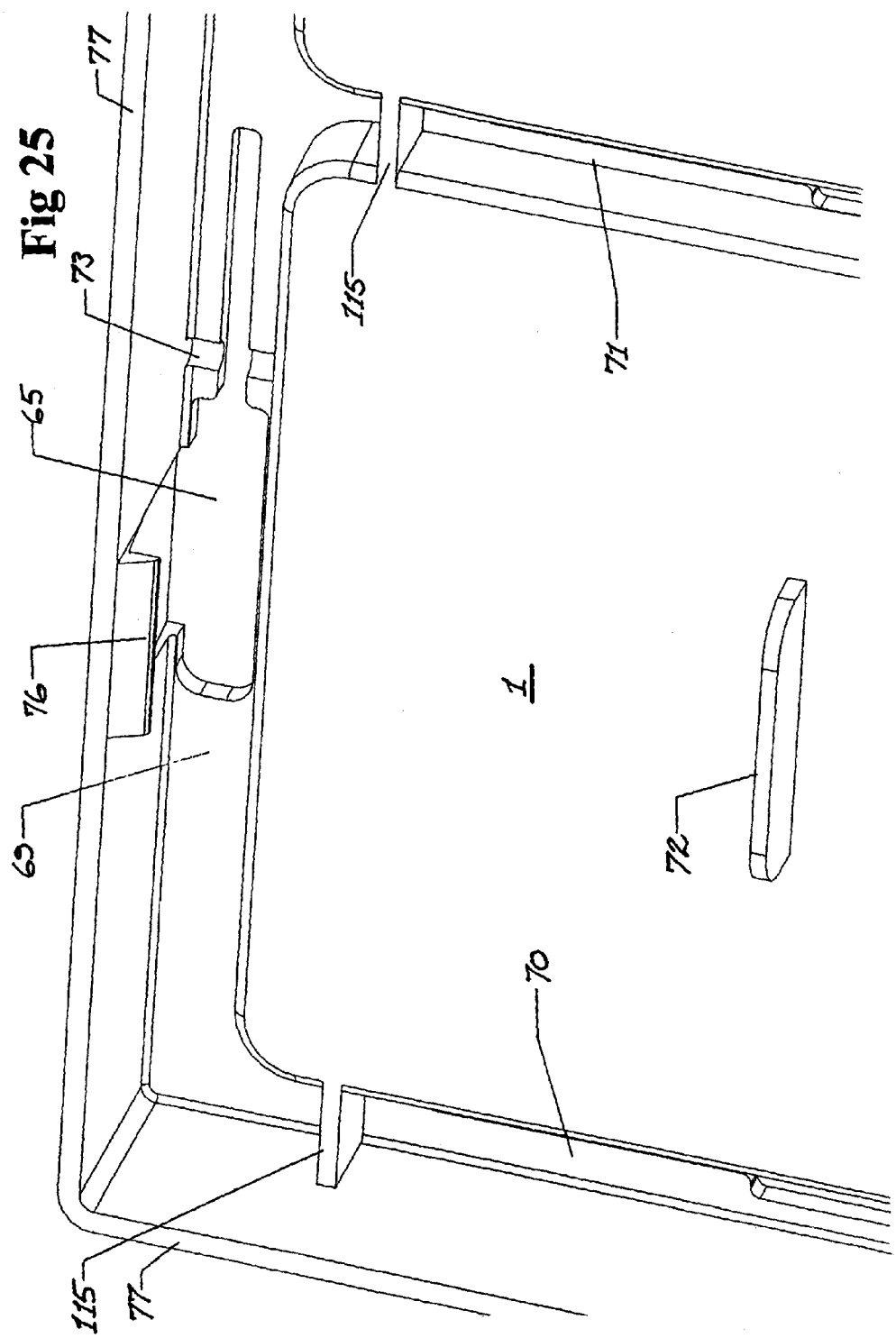
FIG. 25 is a fragmentary perspective view of the inner side part of the floor panel of FIG. 15.

With additional reference to FIG. 25, one or more claws 76 are provided on the lower, inner edge of continuous flange 77. When a said file cabinet is placed in stacked arrangement upon another, said claws are elastically deflected to pass down over the outside of strikers 107 of the said roof panel below to engage the lower edges of said strikers. The abutment of webs 75 (as depicted in FIG. 15) with the outer edge 21 of said roof panel and the engagement of claws 76 with strikers 107 act to positively locate a said superincumbent floor panel upon a said roof panel below.

Obviously, any combination of the various attachment means described herein may optionally be employed to attach one panel to another.

In an alternative embodiment (not shown), small recesses are provided in appropriate positions on the underside of said floor panel to accommodate buffers made for a suitable elastic polymer. Said buffers are preferably made from a non-marking material and act to protect surfaces upon which said open file cabinets are deployed and to prevent said cabinets from sliding.

Figure 26:
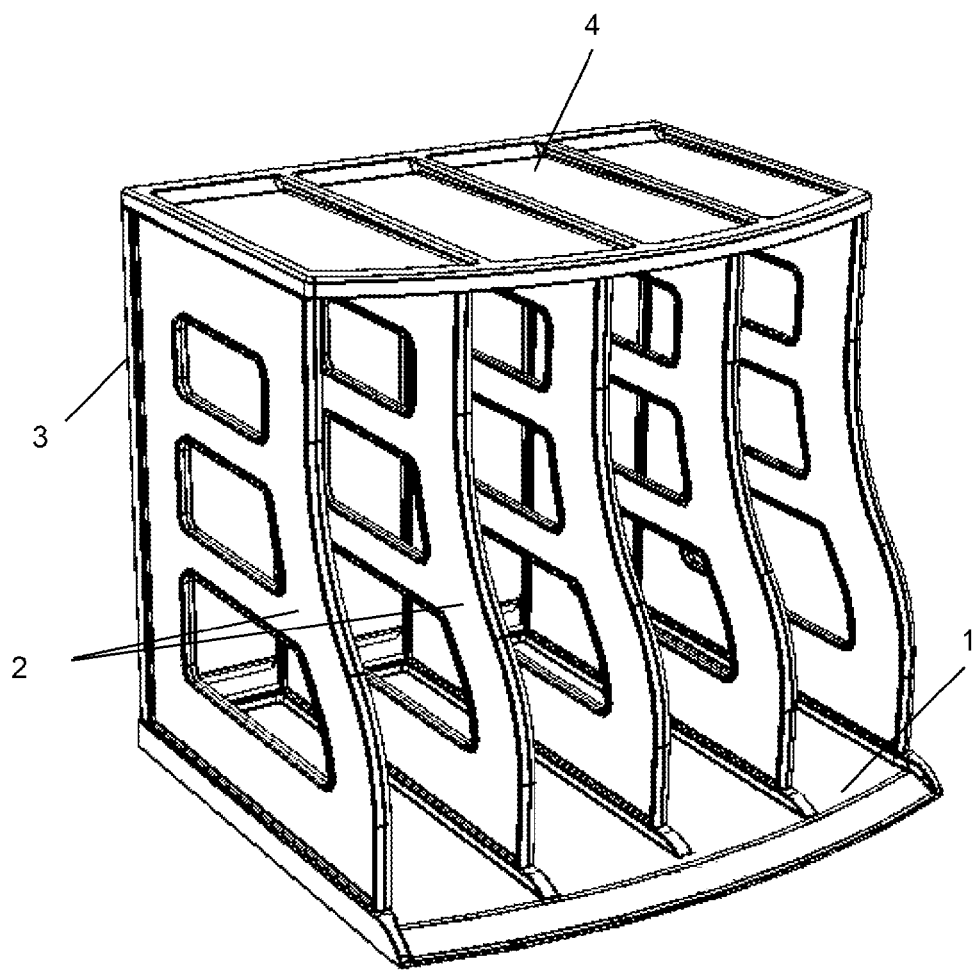
FIG. 26 is a perspective view of a file storage cabinet according to an embodiment of the present invention illustrating the elements of FIGS. 14-25 in an assembled state.

FIG. 26 is a perspective view of the file storage cabinet illustrating the elements of FIGS. 14-25 in an assembled state. The file storage cabinet includes floor panel 1, side and divider panels 2, back panel 3, and roof panel 4.

The present invention, in all of its embodiments, lends itself to be sold or provided in knocked-down form and readily assembled by the purchaser or acquirer. Further, an assembled unit is readily disassembled for storage or transportation.

The invention claimed is:

1. A cabinet for storage of files, books, or papers, comprising:
   a floor panel;
   vertically-arranged side panels fixed to side edges of said floor panel;
   one or more divider panels fixed to said floor panel and positioned parallel to and intermediate of said side panels;
   a vertically-arranged back panel fixed to rear edges of said floor panel and said side and divider panels;
   a roof panel fixed over or to said side panels, said divider panels and said back panel, wherein said side, divider, back and roof panels are successively fixed in place to locate and positively lock in place previously fixed panels thereby preventing their inadvertent displacement;
   stiffening ribbing provided around edges of said side and divider panels being blended into said panels at their open edges to prevent obstruction of articles being placed in or withdrawn from said cabinet;
   a plurality of locating and releasable fixing means being provided on any lower, rearward and upper edges of said side, divider and back panels, said fixing means cooperating with complementary means provided in any of said floor panel, said back panel and said roof panel;
   wherein upper surfaces of said roof panel comprise complementary shapings which have dual functions of providing receptacles for small articles, and of cooperating with complementary shapings of an underside of said floor panel to provide a locating function when multiple said cabinets are in stacked arrangement;
   wherein said cabinet is configured to be assembled into a stiff and secure structure capable of multiple stacking, able to sustain robust treatment without dislodgement of components, and to be readily disassembled; and wherein a front part of said floor panel projecting outwardly beyond outer, lower edges of said side and divider panels is formed into an apron which slopes downwardly to a thin outer edge, said apron minimizing impediment to movement of a file, book or paper being offered up to said cabinet.

2. The cabinet of claim 1 in which the stiffening ribbing comprises outer edge ribs on outer, unsupported edges of said side panels and said divider panels.

3. The cabinet of claim 1 in which said floor panel is provided at its back edge with a robust, raised rail.

4. The cabinet of claim 1 in which internal surfaces of said floor, back and roof panels are provided with raised attachment rails, said raised attachment rails providing a raised surface to abut the stiffening ribbing of said side and divider panels, space on the opposite side to accommodate extending parts of said fixing means and raised edges to guide lower side edges of articles as they are lodged in said cabinet.

5. The cabinet of claim 4 wherein the fixing means on the side and divider panels comprise two or more attachment lugs formed on the lower, back and upper edges of the stiffening ribbing thereof, said attachment lugs being complementary to the complementary means, which comprise keyhole-type attachment apertures provided along said raised, parallel attachment rails of said floor panel, wherein space on an opposite side of said raised attachment rails accommodates the attachment lugs extending from the side, divider and back panels, said side and divider panels being fixed to said floor panel by entering the attachment lugs through larger parts of the attachment apertures and then displacing said dividers and side panels rearwardly such that the attachment lugs are captured beneath narrow parts of said attachment apertures, said small complementary elements providing a positive 'click' engagement when said attachment lugs are properly engaged with said keyhole-type attachment apertures.

6. The cabinet of claim 4 in which said back panel is made with parallel, vertically-arranged edge channels and parallel, vertically-arranged intermediate channels formed on its inner surface, said channels being positioned coincidently with said attachment rails of said floor panel and are adapted to receive the stiffening ribbing along a back edge of said side and divider panels when said divider and side panels are properly fixed to said floor panel; suitable apertures provided in upper parts of said channels accommodating clawed tabs formed on the stiffening ribbing on the back edge of said side and divider panels, said clawed tabs extending through said apertures when said side and divider panels are properly fixed to said floor panel, wherein claws of said clawed tabs are elastically deflected by, and then engage the edge surfaces of said apertures as they pass through said apertures; the engagement of said claws with said back panel positively securing said side and divider panels to said back panel, said side and divider panels being able to be removed by deflecting said clawed tabs laterally to release said claws from their engagement with said edge surfaces of said apertures, thereby permitting said clawed tabs to be withdrawn through said apertures.

7. The cabinet of claim 1 in which, wherein the shapings formed in the upper surfaces of the roof panel form trays to accommodate small stationery articles.

8. The cabinet of claim 1 in which a flat exterior surface is provided in a panel by bonding an exterior skin to the outer surface of said panel, said skin being located by a raised edge provided around a periphery of said panel.

9. The cabinet of claim 1 in which said floor panel is provided with raised, parallel attachment rails along its side edges, raised parallel attachment rails positioned parallel and intermediately to them and a raised attachment rail along its back edge, said attachment rails each having a surface to be abutted, respectively, by stiffening ribbing on lower edges of said side, divider and back panels; keyhole-type attachment apertures formed in said abutting surfaces of said attachment rails being complementary to attachment lugs formed on said stiffening ribbing on the lower edge ribs of said side, divider and back panels, which form the complementary means and the fixing means, respectively, wherein capturing of said lugs in said attachment apertures acting to fix in place the respective side, divider and back panels upon which said lugs are formed; said raised attachment rails providing space on an opposite side to accommodate extending parts of said attachment lugs and raised edges to guide lower side edges of articles as they are lodged in said cabinet.

10. The cabinet of claim 9 in which said floor panel is raised slightly above a supporting surface by a continuous flange passing completely around its lower, outer edge, a plurality of shallow, transverse, downwardly projecting webs being provided on an underside of said floor panel contacting a supporting surface and, thereby, acting to support said floor panel against loadings applied to it, channels in the underside of said floor panel being generated as a result of formation of said attachment rails; webs passing transversely across said channels being provided to confer added stiffness and small concavities arranged transversely to narrow parts of some or all said keyhole-type attachment apertures are provided to engage small complementary convexities provided on upper surfaces of heads or caps of said attachment lugs, said complementary shapings providing a positive 'click' engagement when said attachment lugs are properly engaged with said keyhole-type attachment apertures; a plurality of shallow, arcuately-arranged, downwardly projecting webs being provided on the underside of said floor panel, said webs being positioned to engage an outer edge of said roof panel of a lower cabinet when two or more said cabinets are in stacked arrangement, said arcuately-arranged webs being made with forwardly extending buttresses which act to stiffen a cantilevered outer part of said floor panel of an upper cabinet in a stacked arrangement.

11. The cabinet of claim 1 in which the fixing means comprises two or more attachment lugs formed along the stiffening ribbing on lower edge of said back panel, said complementary means comprises a complementary keyhole-type attachment apertures provided in a raised attachment rail along a rear edge of the floor panel, said back panel being fixed to said floor panel by entering said attachment lugs through larger parts of said attachment apertures and then displacing said back panel laterally such that said attachment lugs are captured beneath narrow parts of said attachment apertures, wherein small complementary convexities and concavities provide a positive 'click' engagement when said attachment lugs are properly engaged with said keyhole-type attachment apertures.

12. The cabinet of claim 1 in which said side panels and said divider panels are made identical, suitable apertures being provided in said side and divider panels for weight-reduction purposes and ribbing being provided around the edges of said apertures to improve stiffness; unsupported outer edges of said side and divider panels being made with suitable cut-away areas to facilitate grasping of files, books or papers accommodated within said cabinet.

13. The cabinet of claim 1 in which one or more sprung tabs are provided on an upper edge of said back panel, said tabs being separated from said back panel by slots such that they are free to be elastically displaced, wherein upper, free ends of said sprung tabs are provided with claws adapted to engage complementary strikers on said roof panel when said roof panel is properly assembled onto said side and divider panels and said back panel, thereby securing said roof panel in place; pads being formed on said sprung tabs to facilitate application of finger pressure to said tabs to deflect them and, thereby, to release engagement of said claws with said roof panel strikers and permit disengagement and removal of said roof panel.

14. The cabinet of claim 1 in which said side and divider panels are made with a horizontal rib along their upper edges, said horizontal ribs being supported from the stiffening ribbing on upper edges of said side and divider panels on a short web having more or less the same thickness as the generality of said side and divider panels, said web being stiffened by a plurality of intermediate stiffening bars, and an outer end of each said rib being formed into a projecting toe; side edge channels being formed along side edges of an underside of said roof panel, intermediate channels being formed parallel to said side edge channels on the underside of said roof panel, and a back edge channel being formed along a back edge of the underside of said roof panel; anchor lugs are arranged in a transverse line and located in said side edge and intermediate channels towards their outer ends and are adapted to accommodate said toes between said anchor lugs and the underside of said roof panel, an outer edge of each said web immediately beneath said toes being captured in a notch formed in an inner edge of each said anchor lug; said roof panel being assembled to said side and divider panels and said back panel by tilting said roof panel such that said anchor lugs can be offered up to and engaged with said toes and, with visual confirmation of said engagement, lowering of said roof panel to a horizontal position while urging it inwardly to maintain engagement of said anchor lugs with said toes; said horizontal position of said roof panel causing said horizontal ribs of said side and divider panels to enter said side edge and intermediate channels formed on the underside of said roof panel and said horizontal rib formed on the upper edge of said back panel to enter said channel formed on the underside of the back edge of said roof panel, upper ends of sprung tabs provided on the upper edge of said back panel being simultaneously elastically deflected forwardly by claws contacting angled edges of strikers formed at an inner edge of said roof panel, said claws riding over and engaging the edges of said strikers.

15. The cabinet of claim 14 in which one or more buttresses are provided on the underside of said roof panel immediately forward of said sprung tabs in their positions of engagement with said strikers, said buttresses acting to limit inward elastic deflection of said sprung tabs when finger pressure is applied to said sprung tabs.

16. The cabinet of claim 1 in which disassembly of said cabinet is effected by reversal of a processes of installing said roof panel on said side, divider and back panels, installing of said side and divider panels on said floor and back panels and installing of said back panel on said floor panel, wherein sprung tabs provided on the upper edge of said back panel being elastically deflected to release a back edge of said roof panel and clawed tabs on the stiffening ribbing of said side and divider panels being elastically deflected to disengage them from outer edge surfaces of apertures in said back panel to release said side and divider panels.

17. The cabinet of claim 1 in which, when two or more said cabinets are in stacked arrangement, one or more claws provided on a lower, inner edge of a back part of a continuous flange or skirt passing around said floor panel of an upper one of the cabinets are elastically deflected to pass down over an outside back surface of the said roof panel of a lower one of said cabinets, wherein arcuately-arranged webs formed on an underside of said floor panel of the upper cabinet abut an outer edge of said roof panel of the lower cabinet.

18. A cabinet for storage, comprising:
a floor panel;
vertically-arranged side panels fixed to side edges of said floor panel;
one or more divider panels fixed to said floor panel and positioned parallel to and intermediate of said side panels;
a vertically-arranged back panel fixed to rear edges of said floor panel and said side and divider panels;
a roof panel fixed over or to said side panels, said side panels and said back panel, wherein said side, divider, back and roof panels are successively fixed in place to locate and positively lock in place previously fixed panels thereby preventing their inadvertent displacement;
stiffening ribbing provided around all edges of said side and divider panels being blended into said panels at their open edges to prevent obstruction of articles being placed in or withdrawn from said cabinet;
raised, parallel attachment rails provided on internal surfaces of said floor, back and roof panels, said raised attachment rails providing a raised surface to abut the stiffening ribbing of said side and divider panels;
a plurality of locating and releasable fixing elements provided on lower, rearward and upper edges of said side, divider and back panels, said fixing elements cooperating with complementary elements provided in said floor panel, said back panel and said roof panel, wherein said releasable fixing elements on the side and divider panels comprise two or more attachment lugs formed on the lower, back and upper edges of the stiffening ribbing thereof, said attachment lugs being complementary to keyhole-type attachment apertures provided along said raised, parallel attachment rails of said floor panel, wherein space on an opposite side of said raised attachment rails accommodates the attachment lugs extending from the side, divider and back panels, said side and divider panels being fixed to said floor panel by entering the attachment lugs through larger parts of the attachment apertures and then displacing said dividers and side panels rearwardly such that the attachment lugs are captured beneath narrow parts of said attachment apertures, said small complementary elements providing a positive 'click' engagement when said attachment lugs are properly engaged with said keyhole-type attachment apertures;
wherein upper surfaces of said roof panel comprise complementary shapings which have dual functions of providing receptacles for small articles, and of cooperating with complementary shapings of an underside of said floor panel to provide a locating function when multiple said cabinets are in stacked arrangement;
wherein said cabinet is configured to be assembled into a stiff and secure structure capable of multiple stacking, able to sustain robust treatment without dislodgement of components, and to be readily disassembled.

19. A cabinet for storage, comprising:

a floor panel;

vertically-arranged side panels fixed to side edges of said floor panel;

one or more divider panels fixed to said floor panel and positioned parallel to and intermediate of said side panels;

a vertically-arranged back panel fixed to rear edges of said floor panel and said side and divider panels;

a roof panel fixed over or to said side panels, said divider panels and said back panel, wherein said side, divider, back and roof panels are successively fixed in place to locate and positively lock in place previously fixed panels thereby preventing their inadvertent displacement;

stiffening ribbing provided around all edges of said side and divider panels being blended into said panels at their open edges to prevent obstruction of articles being placed in or withdrawn from said cabinet;

a plurality of locating and releasable fixing means being provided on any lower, rearward and upper edges of said side, divider and back panels, said fixing means cooperating with complementary means provided in any of said floor panel, said back panel and said roof panel;

wherein upper surfaces of said roof panel comprise complementary shapings which have dual functions of providing receptacles for small articles, and of cooperating with complementary shapings of an underside of said floor panel to provide a locating function when multiple said cabinets are in stacked arrangement;

wherein said cabinet is configured to be assembled into a stiff and secure structure capable of multiple stacking, able to sustain robust treatment without dislodgement of components, and to be readily disassembled; and wherein the floor panel comprises:

a continuous flange or skirt passing around said floor panel, one or more claws on a lower, inner edge of a back part of the continuous flange or skirt, and a plurality of shallow, arcuately-arranged, downwardly projecting webs provided on an underside of said floor panel, wherein when two or more said cabinets are in a stacked arrangement, the one or more claws provided on the flange or skirt of an upper one of the cabinets are elastically deflected to pass down over an outside back surface of the said roof panel of a lower one of the cabinets to engage recesses formed therein, wherein the plurality of downwardly projecting webs abut an outer edge of said roof panel and engagement of said claws with recesses in the roof panel of the lower cabinet to positively locate the floor panel of the upper cabinet upon the roof panel of the lower cabinet.

* * * * *

UNITED STATES PATENT AND TRADEMARK OFFICE
CERTIFICATE OF CORRECTION

PATENT NO.        : 9,504,320 B2
APPLICATION NO.   : 14/374457
DATED             : November 29, 2016
INVENTOR(S)       : Brian Harold Page 1 of 1

It is certified that error appears in the above-identified patent and that said Letters Patent is hereby corrected as shown below:

In the Claims

In Column 15:
In Claim 16, Line 60, delete "processes" and insert therefore --process--.

Signed and Sealed this
First Day of May, 2018

Andrei Iancu
*Director of the United States Patent and Trademark Office*